United States Patent
Landefeld et al.

(10) Patent No.: US 10,726,624 B2
(45) Date of Patent: *Jul. 28, 2020

(54) AUTOMATIC CREATION OF DRILL PATHS

(71) Applicant: Domo, Inc., American Fork, UT (US)

(72) Inventors: Adam Landefeld, Lehi, UT (US); Gary Gibb, Lindon, UT (US); Alan Adams Winters, Lindon, UT (US); Daren Thayne, Orem, UT (US); Jeff Burtenshaw, West Jordan, UT (US); Mardell Cheney, Highland, UT (US)

(73) Assignee: Domo, Inc., American Fork, UT (US)

( * ) Notice: Subject to any disclaimer, the term of this patent is extended or adjusted under 35 U.S.C. 154(b) by 179 days.

This patent is subject to a terminal disclaimer.

(21) Appl. No.: 15/682,536

(22) Filed: Aug. 21, 2017

(65) Prior Publication Data

US 2017/0351407 A1    Dec. 7, 2017

Related U.S. Application Data

(63) Continuation of application No. 14/256,299, filed on Apr. 18, 2014, now Pat. No. 9,792,017, which is a (Continued)

(51) Int. Cl.
*G06F 3/048*     (2013.01)
*G06T 19/00*    (2011.01)
(Continued)

(52) U.S. Cl.
CPC .......... *G06T 19/00* (2013.01); *G06F 3/04845* (2013.01); *G06F 3/04883* (2013.01); *G06T 11/206* (2013.01)

(58) Field of Classification Search
CPC ... G06T 19/00; G06T 11/206; G06F 3/04883; G06F 3/04845
See application file for complete search history.

(56) References Cited

U.S. PATENT DOCUMENTS 5,359,712 A    10/1994 Cohen et al.
5,375,201 A    12/1994 Davoust
(Continued)

OTHER PUBLICATIONS

Wang et al., "A Big Data Processing Methods For Visualization," 2014 IEEE 3rd International Conference on Cloud Computing and Intelligence Systems, Shenzhen, 2014, pp. 571-575.*
(Continued)

*Primary Examiner* — Maikhanh Nguyen
(74) *Attorney, Agent, or Firm* — Patent Law Works LLP

(57) ABSTRACT

A data analysis system may automatically suggest data visualizations to a user. A primary data visualization may be displayed to graphically illustrate a primary data set of a database. Criteria may be automatically applied to the database to identify a secondary data set that meets the criteria. A secondary data visualization that graphically illustrates the secondary data visualization and/or a corresponding indicator may be displayed. Multiple visualizations and/or indicators may be displayed, and the user may select one for viewing. The criteria may again be applied to the database to identify a tertiary data set. An analysis path may be recorded to enable the user to easily view the decisions made and/or the data visualizations viewed. The criteria may include determination that the secondary data set has the desired amount of data, has unique data types or descriptors, includes data previously selected by the user, or the like.

19 Claims, 16 Drawing Sheets

Related U.S. Application Data continuation-in-part of application No. 13/535,019, filed on Jun. 27, 2012, now Pat. No. 9,202,297.

(60) Provisional application No. 61/506,912, filed on Jul. 12, 2011, provisional application No. 61/814,136, filed on Apr. 19, 2013, provisional application No. 61/814,769, filed on Apr. 22, 2013.

(51) Int. Cl.
*G06T 11/20* (2006.01)
*G06F 3/0488* (2013.01)
*G06F 3/0484* (2013.01)

(56) References Cited

U.S. PATENT DOCUMENTS

| | | |
|---|---|---|
| 5,416,895 A | 5/1995 | Anderson et al. |
| 5,423,033 A | 6/1995 | Yuen |
| 5,461,708 A | 10/1995 | Kahn |
| 5,550,964 A | 8/1996 | Davoust |
| 5,581,678 A | 12/1996 | Kahn |
| 5,586,240 A | 12/1996 | Khan et al. |
| 5,600,775 A | 2/1997 | King et al. |
| 5,625,767 A | 4/1997 | Bartell et al. |
| 5,634,133 A | 5/1997 | Kelley |
| 5,689,667 A | 11/1997 | Kurtenbach |
| 5,737,557 A | 4/1998 | Sullivan |
| 5,844,558 A | 12/1998 | Kumar et al. |
| 5,929,854 A | 7/1999 | Ross |
| 5,933,823 A | 8/1999 | Cullen et al. |
| 5,970,471 A | 10/1999 | Hill |
| 5,990,888 A | 11/1999 | Blades et al. |
| 6,016,502 A | 1/2000 | Haneda et al. |
| 6,023,280 A | 2/2000 | Becker et al. |
| 6,298,174 B1 | 10/2001 | Lantrip et al. |
| 6,484,168 B1 | 11/2002 | Pennock et al. |
| 6,529,217 B1 | 3/2003 | Maguire, III et al. |
| 6,577,304 B1 | 6/2003 | Yablonski et al. |
| 6,613,100 B2 | 9/2003 | Miller |
| 6,626,959 B1 | 9/2003 | Moise et al. |
| 6,707,454 B1 | 3/2004 | Barg et al. |
| 6,904,427 B1 | 6/2005 | Hagiwara et al. |
| 6,940,509 B1 | 9/2005 | Crow et al. |
| 6,985,898 B1 | 1/2006 | Ripley et al. |
| 6,995,768 B2 | 2/2006 | Jou et al. |
| 7,002,580 B1 | 2/2006 | Aggala et al. |
| 7,103,837 B2 | 9/2006 | Sato |
| 7,249,328 B1 | 7/2007 | Davis |
| 7,353,183 B1 | 4/2008 | Musso |
| 7,421,648 B1 | 9/2008 | Davis |
| 7,522,176 B2 | 4/2009 | Tolle et al. |
| 7,546,522 B2 | 6/2009 | Tolle et al. |
| 7,605,804 B2 | 10/2009 | Wilson |
| 7,685,159 B2 | 3/2010 | Mitchell et al. |
| 7,689,933 B1 | 3/2010 | Parsons |
| 7,705,847 B2 | 4/2010 | Helfman et al. |
| 7,788,606 B2 | 8/2010 | Patel et al. |
| 7,809,582 B2 | 10/2010 | Wessling et al. |
| 8,089,653 B2 | 1/2012 | Kobashi |
| 8,099,674 B2 | 1/2012 | Mackinlay et al. |
| 8,130,211 B2 | 3/2012 | Abernathy |
| 8,145,600 B1 | 3/2012 | Lewis et al. |
| 8,176,096 B2 | 5/2012 | Allyn et al. |
| 8,185,839 B2 | 5/2012 | Jalon et al. |
| 8,201,096 B2 | 6/2012 | Robert et al. |
| 8,214,747 B1 | 7/2012 | Yankovich et al. |
| 8,245,156 B2 | 8/2012 | Mouilleseaux et al. |
| 8,260,658 B2 * | 9/2012 | Fenstermaker .. G06Q 10/06393 705/7.39 |
| 8,261,194 B2 | 9/2012 | Billiard et al. |
| 8,286,098 B2 | 10/2012 | Ju et al. |
| 8,289,316 B1 | 10/2012 | Reisman et al. |
| 8,291,349 B1 | 10/2012 | Park et al. |
| 8,291,350 B1 | 10/2012 | Park et al. |
| 8,296,654 B2 | 10/2012 | Ahlberg et al. |
| 8,456,466 B1 | 6/2013 | Reisman et al. |
| 8,463,790 B1 | 6/2013 | Joshi et al. |
| 8,468,466 B2 | 6/2013 | Cragun et al. |
| 8,499,284 B2 | 7/2013 | Pich |
| 8,549,432 B2 | 10/2013 | Warner |
| 8,566,700 B2 | 10/2013 | Ueda |
| 8,578,294 B2 | 11/2013 | YEom et al. |
| 8,579,814 B2 | 11/2013 | Fotiades et al. |
| 8,434,007 B2 | 12/2013 | Morita |
| 8,621,391 B2 | 12/2013 | Leffert et al. |
| 8,624,858 B2 | 1/2014 | Fyke et al. |
| 8,627,233 B2 | 1/2014 | Cragun et al. |
| 8,645,863 B2 | 2/2014 | Mandic et al. |
| 8,661,358 B2 | 2/2014 | Duncker et al. |
| 8,667,418 B2 | 3/2014 | Chaudhri et al. |
| 8,671,343 B2 | 3/2014 | Oberstein |
| 8,683,389 B1 | 3/2014 | Bar-Yam et al. |
| 8,686,962 B2 | 4/2014 | Christie |
| 8,707,192 B2 | 4/2014 | Robert et al. |
| 8,713,467 B1 | 4/2014 | Goldenberg et al. |
| 8,738,814 B1 | 5/2014 | Cronin |
| 8,745,280 B1 | 6/2014 | Cronin |
| 8,799,826 B2 | 8/2014 | Missig et al. |
| 8,806,336 B2 | 8/2014 | Miyazawa et al. |
| 8,812,947 B1 | 8/2014 | Maoz et al. |
| 8,826,178 B1 | 9/2014 | Zhang |
| 8,826,181 B2 | 9/2014 | Mouilleseaux et al. |
| 8,863,019 B2 | 10/2014 | Pourshahid et al. |
| 8,878,879 B2 | 11/2014 | Lee et al. |
| 8,886,622 B1 | 11/2014 | Parent et al. |
| 8,914,740 B1 * | 12/2014 | Joos ................... G06F 3/048 715/764 |
| 8,959,423 B2 | 2/2015 | Hammoud |
| 9,026,944 B2 | 5/2015 | Kotler et al. |
| 9,081,494 B2 | 7/2015 | Migos |
| 9,086,794 B2 | 7/2015 | Gil et al. |
| 9,098,182 B2 | 8/2015 | Migos et al. |
| 9,104,365 B2 | 8/2015 | Sirpal et al. |
| 9,182,900 B2 | 11/2015 | Choi |
| 9,195,368 B2 | 11/2015 | Kuscher et al. |
| 9,201,589 B2 | 12/2015 | Nasraoui et al. |
| 9,202,297 B1 | 12/2015 | Winters et al. |
| 9,223,496 B2 | 12/2015 | Howard et al. |
| 9,235,978 B1 | 1/2016 | Charlton |
| 9,244,562 B1 | 1/2016 | Rosenberg et al. |
| 9,250,789 B2 | 2/2016 | Kobayashi |
| 9,251,722 B2 | 2/2016 | Miyazawa et al. |
| 9,261,989 B2 | 2/2016 | Kuscher et al. |
| 9,280,263 B2 | 3/2016 | Kim |
| 9,292,199 B2 | 3/2016 | Choi |
| 9,299,170 B1 | 3/2016 | Moon et al. |
| 9,310,907 B2 | 4/2016 | Victor |
| 9,310,993 B2 | 4/2016 | Choi |
| 9,329,769 B2 | 5/2016 | Sekiguchi et al. |
| 9,354,780 B2 | 5/2016 | Miyake et al. |
| 9,367,198 B2 | 6/2016 | Radakovitz et al. |
| 9,390,349 B2 | 7/2016 | Awano et al. |
| 9,395,826 B1 | 7/2016 | Cronin |
| 9,400,997 B2 | 7/2016 | Beaver et al. |
| 9,424,333 B1 | 8/2016 | Bisignani et al. |
| 9,459,791 B2 | 10/2016 | Mouilleseaux et al. |
| 9,465,452 B2 | 10/2016 | Nishizawa |
| 9,477,315 B2 | 10/2016 | Fujimura et al. |
| 9,513,799 B2 | 12/2016 | Fleizach et al. |
| 9,582,187 B2 | 2/2017 | Gil et al. |
| 9,588,645 B2 | 3/2017 | Heo |
| 9,612,736 B2 | 4/2017 | Lee et al. |
| 9,652,056 B2 | 5/2017 | Park |
| 9,658,766 B2 | 5/2017 | Nan et al. |
| 9,678,343 B2 | 6/2017 | Kuehne et al. |
| 9,716,825 B1 | 7/2017 | Manzari et al. |
| 9,721,375 B1 | 8/2017 | Rivard et al. |
| 9,733,734 B2 | 8/2017 | Chase et al. |
| 9,733,796 B2 | 8/2017 | Warner |
| 9,747,018 B2 | 8/2017 | Han et al. |
| 9,804,726 B1 * | 10/2017 | Joos ................... G06F 3/048 |
| 9,817,548 B2 | 11/2017 | Lai et al. |
| 9,875,023 B2 | 1/2018 | Brown |

(56) References Cited

U.S. PATENT DOCUMENTS

| | | | |
|---|---|---|---|
| 9,880,701 B2 | 1/2018 | Hyun et al. | |
| 9,881,645 B2 | 1/2018 | Novikoff | |
| 9,886,183 B2 | 2/2018 | Lee et al. | |
| 9,996,171 B2 | 6/2018 | Chase et al. | |
| 10,078,421 B2 | 9/2018 | Jeon | |
| 10,139,989 B2* | 11/2018 | Shiroor | G06F 3/0482 |
| 10,168,817 B2 | 1/2019 | Hiraga et al. | |
| 10,254,927 B2 | 4/2019 | Missig et al. | |
| 2002/0087894 A1 | 7/2002 | Foley et al. | |
| 2002/0091678 A1 | 7/2002 | Miller et al. | |
| 2003/0028504 A1 | 2/2003 | Burgoon et al. | |
| 2003/0069873 A1 | 4/2003 | Fox et al. | |
| 2003/0074292 A1 | 4/2003 | Masuda | |
| 2003/0128883 A1 | 7/2003 | Kim et al. | |
| 2003/0158855 A1 | 8/2003 | Farnham et al. | |
| 2003/0167278 A1* | 9/2003 | Baudel | G06T 11/206 |
| 2003/0193502 A1 | 10/2003 | Patel et al. | |
| 2004/0150668 A1 | 8/2004 | Myers et al. | |
| 2004/0189717 A1 | 9/2004 | Conally et al. | |
| 2004/0230599 A1 | 11/2004 | Moore et al. | |
| 2005/0068320 A1* | 3/2005 | Jaeger | G06T 11/206 |
| | | | 345/440 |
| 2005/0091254 A1 | 4/2005 | Stabb et al. | |
| 2005/0091612 A1 | 4/2005 | Stabb et al. | |
| 2005/0134578 A1 | 6/2005 | Chambers et al. | |
| 2005/0246643 A1 | 11/2005 | Gusmorino et al. | |
| 2005/0275622 A1 | 12/2005 | Patel et al. | |
| 2005/0278625 A1 | 12/2005 | Wessling et al. | |
| 2006/0004718 A1 | 1/2006 | McCully et al. | |
| 2006/0020623 A1 | 1/2006 | Terai et al. | |
| 2006/0026535 A1 | 2/2006 | Hotelling et al. | |
| 2006/0036950 A1 | 2/2006 | Himberger et al. | |
| 2006/0041178 A1 | 2/2006 | Viswanathan et al. | |
| 2006/0095865 A1 | 5/2006 | Rostom | |
| 2006/0136819 A1 | 6/2006 | Tolle et al. | |
| 2006/0242164 A1 | 10/2006 | Evans et al. | |
| 2006/0244735 A1 | 11/2006 | Wilson | |
| 2006/0288284 A1 | 12/2006 | Peters et al. | |
| 2007/0008300 A1 | 1/2007 | Yang et al. | |
| 2007/0022000 A1* | 1/2007 | Bodart | G06Q 10/0639 |
| | | | 705/7.38 |
| 2007/0061714 A1 | 3/2007 | Stuple et al. | |
| 2007/0083911 A1 | 4/2007 | Madden et al. | |
| 2007/0124677 A1 | 5/2007 | de los Reyes et al. | |
| 2007/0171716 A1* | 7/2007 | Wright | G06T 11/206 |
| | | | 365/185.12 |
| 2007/0179969 A1 | 8/2007 | Finley et al. | |
| 2007/0186173 A1 | 8/2007 | Both et al. | |
| 2007/0186177 A1 | 8/2007 | Both et al. | |
| 2007/0186186 A1 | 8/2007 | Both et al. | |
| 2007/0189737 A1 | 8/2007 | Chaudhri et al. | |
| 2007/0245238 A1 | 10/2007 | Fugitt et al. | |
| 2007/0252821 A1 | 11/2007 | Hollemans et al. | |
| 2007/0256029 A1 | 11/2007 | Maxwell | |
| 2007/0271528 A1 | 11/2007 | Park et al. | |
| 2008/0037051 A1 | 2/2008 | Otsubo | |
| 2008/0115049 A1 | 5/2008 | Tolle et al. | |
| 2008/0136754 A1 | 6/2008 | Tsuzaki et al. | |
| 2008/0168404 A1 | 7/2008 | Ording | |
| 2008/0180458 A1* | 7/2008 | Favart | G06F 9/455 |
| | | | 345/630 |
| 2008/0195639 A1 | 8/2008 | Freeman et al. | |
| 2008/0244454 A1 | 10/2008 | Shibaike | |
| 2008/0307343 A1 | 12/2008 | Robert et al. | |
| 2008/0309632 A1 | 12/2008 | Westerman et al. | |
| 2009/0006318 A1 | 1/2009 | Lehtipalo et al. | |
| 2009/0007012 A1 | 1/2009 | Mandic et al. | |
| 2009/0007017 A1 | 1/2009 | Anzures et al. | |
| 2009/0024411 A1 | 1/2009 | Albro et al. | |
| 2009/0070301 A1 | 3/2009 | McLean et al. | |
| 2009/0077501 A1 | 3/2009 | Partridge et al. | |
| 2009/0096812 A1* | 4/2009 | Boixel | G06Q 10/00 |
| | | | 345/646 |
| 2009/0106674 A1 | 4/2009 | Bray et al. | |
| 2009/0150177 A1 | 6/2009 | Buck et al. | |
| 2009/0164171 A1 | 6/2009 | Wold et al. | |
| 2009/0210814 A1 | 8/2009 | Agrusa et al. | |
| 2009/0235155 A1 | 9/2009 | Ueda | |
| 2009/0282325 A1 | 11/2009 | Radakovitz et al. | |
| 2009/0284478 A1 | 11/2009 | Baltierra et al. | |
| 2009/0131989 A1 | 12/2009 | Kotler et al. | |
| 2009/0307213 A1 | 12/2009 | Deng et al. | |
| 2009/0307622 A1 | 12/2009 | Jalon et al. | |
| 2009/0307626 A1 | 12/2009 | Jalon et al. | |
| 2009/0315848 A1 | 12/2009 | Ku et al. | |
| 2009/0319897 A1 | 12/2009 | Kotler et al. | |
| 2009/0327213 A1 | 12/2009 | Choudhary | |
| 2009/0327955 A1 | 12/2009 | Mouilleseaux et al. | |
| 2009/0327963 A1 | 12/2009 | Mouilleseaux et al. | |
| 2009/0327964 A1 | 12/2009 | Mouilleseaux et al. | |
| 2010/0005008 A1 | 1/2010 | Duncker et al. | |
| 2010/0005411 A1 | 1/2010 | Duncker et al. | |
| 2010/0031203 A1 | 2/2010 | Morris et al. | |
| 2010/0067048 A1 | 3/2010 | Suzuki | |
| 2010/0070254 A1 | 3/2010 | Tsai et al. | |
| 2010/0077354 A1 | 3/2010 | Russo | |
| 2010/0080491 A1 | 4/2010 | Ohnishi | |
| 2010/0083172 A1 | 4/2010 | Breeds et al. | |
| 2010/0083190 A1 | 4/2010 | Roberts et al. | |
| 2010/0095234 A1 | 4/2010 | Lane et al. | |
| 2010/0097322 A1 | 4/2010 | Hu et al. | |
| 2010/0097338 A1 | 4/2010 | Miyashita et al. | |
| 2010/0100849 A1 | 4/2010 | Fram | |
| 2010/0138766 A1 | 6/2010 | Nakajima | |
| 2010/0157354 A1 | 6/2010 | Darwish | |
| 2010/0161374 A1 | 6/2010 | Horta et al. | |
| 2010/0162152 A1 | 6/2010 | Allyn et al. | |
| 2010/0185962 A1 | 7/2010 | Zhang et al. | |
| 2010/0185989 A1 | 7/2010 | Shiplacoff et al. | |
| 2010/0188353 A1 | 7/2010 | Yoon et al. | |
| 2010/0192102 A1 | 7/2010 | Chmielewski et al. | |
| 2010/0192103 A1 | 7/2010 | Cragun et al. | |
| 2010/0194778 A1 | 8/2010 | Robertson et al. | |
| 2010/0199202 A1 | 8/2010 | Becker | |
| 2010/0205563 A1 | 8/2010 | Haapsaari et al. | |
| 2010/0211895 A1 | 8/2010 | Mistry et al. | |
| 2010/0218115 A1 | 8/2010 | Curtin et al. | |
| 2010/0231536 A1 | 9/2010 | Chaudhri et al. | |
| 2010/0235726 A1 | 9/2010 | Ording et al. | |
| 2010/0235771 A1 | 9/2010 | Gregg, III | |
| 2010/0238176 A1 | 9/2010 | Guo et al. | |
| 2010/0251151 A1* | 9/2010 | Alsbury | G06F 1/1626 |
| | | | 715/765 |
| 2010/0251179 A1 | 9/2010 | Cragun et al. | |
| 2010/0251180 A1 | 9/2010 | Cragun et al. | |
| 2010/0275144 A1 | 10/2010 | Dejoras et al. | |
| 2010/0275159 A1 | 10/2010 | Matsubara et al. | |
| 2010/0283750 A1 | 11/2010 | Kang et al. | |
| 2010/0299637 A1 | 11/2010 | Chmielewski et al. | |
| 2010/0299638 A1 | 11/2010 | Choi | |
| 2010/0306702 A1 | 12/2010 | Warner | |
| 2010/0312462 A1 | 12/2010 | Gueziec et al. | |
| 2010/0312803 A1 | 12/2010 | Gong et al. | |
| 2010/0332511 A1 | 12/2010 | Stockton et al. | |
| 2011/0001628 A1 | 1/2011 | Miyazawa et al. | |
| 2011/0004821 A1 | 1/2011 | Miyazawa et al. | |
| 2011/0016390 A1 | 1/2011 | Oh et al. | |
| 2011/0016433 A1 | 1/2011 | Shipley | |
| 2011/0018806 A1 | 1/2011 | Yano | |
| 2011/0041098 A1 | 2/2011 | Kajiya et al. | |
| 2011/0050562 A1 | 3/2011 | Schoen et al. | |
| 2011/0055691 A1 | 3/2011 | Carlen et al. | |
| 2011/0055760 A1 | 3/2011 | Drayton et al. | |
| 2011/0069019 A1 | 3/2011 | Carpendale et al. | |
| 2011/0074171 A1 | 3/2011 | Maehara et al. | |
| 2011/0074696 A1 | 3/2011 | Rapp et al. | |
| 2011/0074716 A1 | 3/2011 | Ono | |
| 2011/0074718 A1 | 3/2011 | Yeh et al. | |
| 2011/0074719 A1 | 3/2011 | Yeh et al. | |
| 2011/0077851 A1 | 3/2011 | Ogawa et al. | |
| 2011/0115814 A1 | 5/2011 | Heimendinger et al. | |
| 2011/0141031 A1 | 6/2011 | McCullough et al. | |
| 2011/0148796 A1 | 6/2011 | Hollemans et al. | |

(56) References Cited

U.S. PATENT DOCUMENTS

| | | |
|---|---|---|
| 2011/0173569 A1 | 7/2011 | Howes et al. |
| 2011/0179376 A1 | 7/2011 | Berestov et al. |
| 2011/0188760 A1 | 8/2011 | Wright et al. |
| 2011/0199639 A1 | 8/2011 | Tani et al. |
| 2011/0205163 A1 | 8/2011 | Hinckley et al. |
| 2011/0209048 A1 | 8/2011 | Scott et al. |
| 2011/0209088 A1 | 8/2011 | Hinckley et al. |
| 2011/0209093 A1 | 8/2011 | Hinckley et al. |
| 2011/0212717 A1* | 9/2011 | Rhoads ............... G06K 9/00664 |
| | | 455/420 |
| 2011/0234503 A1 | 9/2011 | Fitzmaurice et al. |
| 2011/0270851 A1 | 11/2011 | Mishina et al. |
| 2011/0271233 A1 | 11/2011 | Radakovitz et al. |
| 2011/0276603 A1 | 11/2011 | Bojanic et al. |
| 2011/0279363 A1 | 11/2011 | Shoji et al. |
| 2011/0283231 A1* | 11/2011 | Richstein ............... G06F 3/0488 |
| | | 715/810 |
| 2011/0291988 A1 | 12/2011 | Bamji |
| 2011/0298708 A1 | 12/2011 | Hsu et al. |
| 2011/0302490 A1 | 12/2011 | Koarai |
| 2011/0320458 A1 | 12/2011 | Karana |
| 2012/0011437 A1 | 1/2012 | James et al. |
| 2012/0032901 A1 | 2/2012 | Kwon |
| 2012/0036434 A1 | 2/2012 | Oberstein |
| 2012/0050192 A1 | 3/2012 | Kobayashi |
| 2012/0056836 A1 | 3/2012 | Cha et al. |
| 2012/0056878 A1 | 3/2012 | Miyazawa et al. |
| 2012/0081375 A1 | 4/2012 | Robert et al. |
| 2012/0084644 A1 | 4/2012 | Robert et al. |
| 2012/0089933 A1 | 4/2012 | Garand et al. |
| 2012/0092286 A1 | 4/2012 | O'Prey et al. |
| 2012/0127206 A1 | 5/2012 | Thompson et al. |
| 2012/0133585 A1 | 5/2012 | Han et al. |
| 2012/0144335 A1* | 6/2012 | Abeln .................. G06Q 10/06 |
| | | 715/771 |
| 2012/0154269 A1 | 6/2012 | Oki et al. |
| 2012/0162265 A1 | 6/2012 | Heinrich et al. |
| 2012/0166470 A1 | 6/2012 | Baumgaertel et al. |
| 2012/0174034 A1 | 7/2012 | Chae et al. |
| 2012/0180002 A1 | 7/2012 | Campbell et al. |
| 2012/0210275 A1 | 8/2012 | Park et al. |
| 2012/0254783 A1 | 10/2012 | Pourshahid et al. |
| 2012/0262489 A1 | 10/2012 | Caliendo, Jr. et al. |
| 2012/0284753 A1 | 11/2012 | Roberts et al. |
| 2012/0293427 A1 | 11/2012 | Mukai et al. |
| 2012/0303548 A1* | 11/2012 | Johnson ............... G06Q 40/04 |
| | | 705/36 R |
| 2012/0306748 A1 | 12/2012 | Fleizach et al. |
| 2012/0319977 A1 | 12/2012 | Kuge |
| 2013/0002802 A1 | 1/2013 | Mock |
| 2013/0007577 A1 | 1/2013 | Hammoud |
| 2013/0007583 A1 | 1/2013 | Hammoud |
| 2013/0019175 A1 | 1/2013 | Kotler et al. |
| 2013/0019205 A1 | 1/2013 | Gil et al. |
| 2013/0033448 A1 | 2/2013 | Yano et al. |
| 2013/0036380 A1 | 2/2013 | Symons |
| 2013/0047125 A1 | 2/2013 | Kangas et al. |
| 2013/0067391 A1 | 3/2013 | Pittappilly et al. |
| 2013/0076668 A1 | 3/2013 | Maeda |
| 2013/0080444 A1 | 3/2013 | Wakefield et al. |
| 2013/0093782 A1 | 4/2013 | Wakefield et al. |
| 2013/0097177 A1* | 4/2013 | Fan ..................... G06F 16/438 |
| | | 707/748 |
| 2013/0097544 A1 | 4/2013 | Parker et al. |
| 2013/0104079 A1 | 4/2013 | Yasui et al. |
| 2013/0114913 A1 | 5/2013 | Nagarajan et al. |
| 2013/0127758 A1 | 5/2013 | Kim et al. |
| 2013/0127911 A1 | 5/2013 | Brown |
| 2013/0145244 A1 | 6/2013 | Rothschiller et al. |
| 2013/0145316 A1 | 6/2013 | Heo |
| 2013/0169549 A1 | 7/2013 | Seymour et al. |
| 2013/0174032 A1 | 7/2013 | Tse et al. |
| 2013/0185619 A1* | 7/2013 | Ludwig ............... G06F 40/103 |
| | | 715/212 |
| 2013/0201106 A1 | 8/2013 | Naccache |
| 2013/0204862 A1 | 8/2013 | Marchiori |
| 2013/0219340 A1 | 8/2013 | Linge |
| 2013/0222265 A1 | 8/2013 | Smith et al. |
| 2013/0222340 A1 | 8/2013 | Ito |
| 2013/0235071 A1 | 9/2013 | Ubillos et al. |
| 2013/0254662 A1 | 9/2013 | Dunko et al. |
| 2013/0275898 A1 | 10/2013 | Fujimoto et al. |
| 2013/0275904 A1* | 10/2013 | Bhaskaran ............... G06F 16/26 |
| | | 715/771 |
| 2013/0293672 A1 | 11/2013 | Suzuki et al. |
| 2013/0307861 A1 | 11/2013 | Lang et al. |
| 2013/0321340 A1 | 12/2013 | Seo et al. |
| 2013/0321458 A1* | 12/2013 | Miserendino ....... H04L 41/0883 |
| | | 345/629 |
| 2013/0328804 A1 | 12/2013 | Oshima et al. |
| 2013/0346906 A1 | 12/2013 | Farago |
| 2014/0019899 A1 | 1/2014 | Cheng et al. |
| 2014/0022192 A1 | 1/2014 | Hatanaka |
| 2014/0033127 A1 | 1/2014 | Choi |
| 2014/0040794 A1* | 2/2014 | Jones ..................... G06F 3/0484 |
| | | 715/763 |
| 2014/0047380 A1 | 2/2014 | Mak |
| 2014/0071063 A1 | 3/2014 | Kuscher et al. |
| 2014/0075388 A1 | 3/2014 | Kuscher et al. |
| 2014/0078102 A1 | 3/2014 | Araki |
| 2014/0089828 A1 | 3/2014 | Okuma et al. |
| 2014/0092100 A1 | 4/2014 | Chen |
| 2014/0101579 A1 | 4/2014 | Kim et al. |
| 2014/0111422 A1 | 4/2014 | Chow |
| 2014/0111516 A1 | 4/2014 | Hall et al. |
| 2014/0129564 A1 | 5/2014 | Kritt et al. |
| 2014/0157200 A1 | 6/2014 | Jeon |
| 2014/0157210 A1 | 6/2014 | Katz et al. |
| 2014/0173457 A1 | 6/2014 | Wang et al. |
| 2014/0173530 A1 | 6/2014 | Havilio et al. |
| 2014/0189581 A1 | 7/2014 | Kawamata |
| 2014/0210759 A1 | 7/2014 | Toriyama |
| 2014/0215365 A1 | 7/2014 | Hiraga et al. |
| 2014/0229871 A1 | 8/2014 | Tai et al. |
| 2014/0245217 A1 | 8/2014 | Asahara |
| 2014/0267084 A1 | 9/2014 | Krulce et al. |
| 2014/0282145 A1* | 9/2014 | Dewan ................ G06F 3/04842 |
| | | 715/765 |
| 2014/0313142 A1 | 10/2014 | Yairi |
| 2014/0331179 A1 | 11/2014 | Tullis et al. |
| 2014/0340204 A1 | 11/2014 | O'shea |
| 2014/0351738 A1 | 11/2014 | Kokovidis et al. |
| 2015/0009157 A1 | 1/2015 | Chung et al. |
| 2015/0012854 A1 | 1/2015 | Choi et al. |
| 2015/0022432 A1 | 1/2015 | Stewart et al. |
| 2015/0029095 A1 | 1/2015 | Gomez et al. |
| 2015/0029553 A1 | 1/2015 | Fujimoto |
| 2015/0033165 A1 | 1/2015 | Yoo et al. |
| 2015/0035800 A1 | 2/2015 | Uchiyama et al. |
| 2015/0062046 A1 | 3/2015 | Cho et al. |
| 2015/0066356 A1 | 3/2015 | Kirsch et al. |
| 2015/0067555 A1 | 3/2015 | Joo et al. |
| 2015/0074615 A1 | 3/2015 | Han et al. |
| 2015/0106709 A1 | 4/2015 | Kritt et al. |
| 2015/0135109 A1 | 5/2015 | Zambetti et al. |
| 2015/0143233 A1 | 5/2015 | Weksler et al. |
| 2015/0153571 A1 | 6/2015 | Ballard et al. |
| 2015/0160807 A1 | 6/2015 | Vakharia et al. |
| 2015/0160843 A1 | 6/2015 | Kim et al. |
| 2015/0169057 A1 | 6/2015 | Shiroor et al. |
| 2015/0169096 A1 | 6/2015 | Nishizawa |
| 2015/0169530 A1 | 6/2015 | Otero et al. |
| 2015/0169531 A1 | 6/2015 | Campbell et al. |
| 2015/0186350 A1 | 7/2015 | Hicks |
| 2015/0186351 A1 | 7/2015 | Hicks et al. |
| 2015/0205483 A1 | 7/2015 | Takamura et al. |
| 2015/0212688 A1 | 7/2015 | Mcmillan et al. |
| 2015/0227308 A1 | 8/2015 | Kim et al. |
| 2015/0234562 A1 | 8/2015 | Ording |
| 2015/0261728 A1 | 9/2015 | Davis |
| 2015/0268805 A1 | 9/2015 | Patel |
| 2015/0286636 A1 | 10/2015 | Elkhou et al. |
| 2015/0301609 A1 | 10/2015 | Park et al. |

(56) References Cited

U.S. PATENT DOCUMENTS

| | | |
|---|---|---|
| 2015/0338974 A1 | 11/2015 | Stone |
| 2015/0341212 A1 | 11/2015 | Hsiao et al. |
| 2015/0356160 A1* | 12/2015 | Berwick ............ G06F 3/04842 715/781 |
| 2015/0363082 A1 | 12/2015 | Zhao et al. |
| 2015/0378978 A1 | 12/2015 | Gross et al. |
| 2016/0055232 A1 | 2/2016 | Yang et al. |
| 2016/0070430 A1 | 3/2016 | Kim et al. |
| 2016/0070461 A1 | 3/2016 | Herbordt et al. |
| 2016/0092080 A1 | 3/2016 | Swanson et al. |
| 2016/0139695 A1 | 5/2016 | Chase et al. |
| 2016/0147308 A1 | 5/2016 | Gelman et al. |
| 2016/0188181 A1 | 6/2016 | Smith |
| 2016/0202892 A1 | 7/2016 | Rath et al. |
| 2016/0253086 A1 | 9/2016 | Jiang et al. |
| 2016/0259528 A1 | 9/2016 | Foss et al. |
| 2016/0274686 A1 | 9/2016 | Ruiz et al. |
| 2016/0274733 A1 | 9/2016 | Hasegawa et al. |
| 2016/0274750 A1 | 9/2016 | Stewart |
| 2016/0283049 A1 | 9/2016 | Faydi et al. |
| 2016/0283054 A1 | 9/2016 | Suzuki |
| 2016/0283081 A1 | 9/2016 | Johnston et al. |
| 2016/0291849 A1 | 10/2016 | Stockwell et al. |
| 2016/0306328 A1 | 10/2016 | Ko et al. |
| 2016/0313911 A1 | 10/2016 | Langseth et al. |
| 2016/0364367 A1 | 12/2016 | Takayama |
| 2016/0370994 A1 | 12/2016 | Galu, Jr. |
| 2017/0010781 A1 | 1/2017 | Bostick et al. |
| 2017/0031587 A1 | 2/2017 | Kimoto et al. |
| 2017/0060819 A1 | 3/2017 | Rucine et al. |
| 2017/0102838 A1 | 4/2017 | Roy et al. |
| 2017/0109023 A1 | 4/2017 | Cherna et al. |
| 2017/0109026 A1 | 4/2017 | Ismailov et al. |
| 2017/0147188 A1 | 5/2017 | Rong |
| 2017/0185258 A1 | 6/2017 | Fu |
| 2017/0185281 A1 | 6/2017 | Park et al. |
| 2017/0192658 A1 | 7/2017 | Kim et al. |
| 2017/0193058 A1 | 7/2017 | Fung et al. |
| 2017/0199651 A1 | 7/2017 | Pintoffl |
| 2017/0221244 A1 | 8/2017 | Hiraga et al. |
| 2017/0228138 A1 | 8/2017 | Paluka et al. |
| 2017/0269696 A1 | 9/2017 | Naidoo et al. |
| 2017/0269800 A1 | 9/2017 | Park et al. |
| 2017/0277367 A1 | 9/2017 | Pahud et al. |
| 2017/0287230 A1 | 10/2017 | Gortler et al. |
| 2017/0315635 A1 | 11/2017 | Chase et al. |
| 2017/0315721 A1 | 11/2017 | Merel et al. |
| 2017/0329458 A1 | 11/2017 | Kanemaru et al. |
| 2018/0040154 A1 | 2/2018 | Gibb et al. |
| 2018/0069983 A1 | 3/2018 | Cho et al. |
| 2018/0101239 A1 | 4/2018 | Yin et al. |
| 2018/0152636 A1 | 5/2018 | Yim et al. |
| 2018/0203596 A1 | 7/2018 | Dhaliwal et al. |
| 2018/0239519 A1 | 8/2018 | Hinckley et al. |
| 2018/0239520 A1 | 8/2018 | Hinckley et al. |
| 2018/0246639 A1 | 8/2018 | Han et al. |
| 2018/0329623 A1 | 11/2018 | Usami et al. |
| 2019/0056856 A1 | 2/2019 | Simmons et al. |
| 2019/0094850 A1 | 3/2019 | Li et al. |
| 2019/0146643 A1 | 5/2019 | Foss et al. |

OTHER PUBLICATIONS

K. Kroeker, "Seeing Data: New Methods For Understanding Information," IEEE Computer Graphics and Applications, vol. 24, No. 3, pp. 6-12, May-Jun. 2004.*

Nonaka et al., "Design of Cooperative Visualization Environment with Intensive Data Management in Project Lifecycle," 2008 Workshop on Ultrascale Visualization, Austin, TX, 2008, pp. 55-61.*

F. B. Viegas, M. Wattenberg, F. van Ham, J. Kriss and M. McKeon, "ManyEyes: a Site for Visualization at Internet Scale," in IEEE Transactions on Visualization and Computer Graphics, vol. 13, No. 6, pp. 1121-1128, Nov.-Dec. 2007.*

* cited by examiner

Database
111

Metadata
210

| Data Descriptor | Data Type | Data Category | Data Status |
|---|---|---|---|
| Order Date | Date | Dimension | Yes |
| Order Priority | String | Dimension | No |
| Order Quantity | Number | Measure | No |
| Sales | Number | Measure | Yes |
| Ship Mode | String | Dimension | No |
| Profit | Number | Measure | No |
| Shipping Cost | Number | Measure | No |
| Customer Name | String | Dimension | No |
| Customer State | String/Location | Dimension | No |
| Zip Code | String/ZIP | Dimension | No |
| Region Cust. Segment | String | Dimension | No |
| Product Category | String | Dimension | No |
| Product Subcategory | String | Dimension | No |
| Product Container | String | Dimension | No |
| Ship Date | Date | Dimension | No |

*FIG. 6*

| Data Descriptor | Data Type | Data Category | Data Status |
|---|---|---|---|
| Order Priority | String | Dimension | No |
| Ship Mode | String | Dimension | No |
| Customer Name | String | Dimension | No |
| Customer State | String/Location | Dimension | No |
| Region Cust. Segment | String | Dimension | No |
| Product Category | String | Dimension | No |

*FIG. 8*

AUTOMATIC CREATION OF DRILL PATHS

CROSS-REFERENCE TO RELATED APPLICATIONS

The present application is a continuation of U.S. patent application Ser. No. 14/256,299, entitled "Automatic Creation of Drill Paths," filed Apr. 18, 2014, which is a continuation-in-part of U.S. patent application Ser. No. 13/535,019 entitled "Dynamic Expansion of Data Visualizations," filed Jun. 27, 2012, now U.S. Pat. No. 9,202,297, which claims priority from U.S. Provisional Application No. 61/506,912, entitled "Drill by Expansion," filed Jul. 12, 2011. The present application also claims priority from U.S. Provisional Application No. 61/814,136, entitled "Automatic Creation of Drill Paths," filed Apr. 19, 2013, and from U.S. Provisional Application No. 61/814,769, entitled "Analysis Path Playback and Annotation," filed Apr. 22, 2013, the entire contents of the above are incorporated herein by reference in their entirety.

FIELD OF THE INVENTION

The present invention relates to systems and methods for displaying information to a user, and more particularly, facilitating viewing and/or interaction with graphical displays of quantitative data.

DESCRIPTION OF THE RELATED ART

Data visualizations include all ways of graphically representing numerical data, including charts, graphs, infographics, and maps. Data visualizations are widely used to rapidly and concisely convey relationships between and among the various data in a data set. For example, in the context of business management, a data set may include sales revenue broken down by month. Analyzing the raw data may be cumbersome, but a graph of sales revenue over time can rapidly convey comparative performance, sales trends over time, and other useful information to a user such as a business executive.

Oftentimes, a user will proceed from one data visualization to another in the course of analysis. The navigation pathway followed by the user may be known as a "drill path". A drill path may include not only data visualizations, but also documents, web sites, raw data, and/or other resources. Creating a drill path can involve a significant amount of time; the user may be required to manually look up the data he or she is seeking. Further, in many cases, a drill path may be incomplete because it may not adequately capture the variety of ways in which a user may want to explore the data. Hence, highly relevant data visualizations and/or other resources may be missed by the user.

Yet further, in many cases, unless the user has been taking the time to keep careful records of the analysis, the various steps of the analysis that led the user to a particular conclusion may not be recoverable. Accordingly, the user may not be able to utilize intermediate analysis steps to engage in further analysis. Additionally, it may be difficult for the user to present the various steps of analysis to others in the absence of time-consuming record keeping.

SUMMARY

Various embodiments of the present invention provide mechanisms for automatically creating drill paths for analysis. Automatic drill path creation may involve the automated suggestion of one or more resources, such as data visualization, that may be of interest to the user. Such automated suggestions may be based on data shown in a currently-displayed data visualization and/or data items viewed by or otherwise selected by the user.

In one embodiment of the invention, a primary data visualization may first be displayed to graphically illustrate a primary data set of a database. Criteria may be automatically applied to the database to identify one or more secondary data sets that meet the criteria. Secondary data visualizations that graphically illustrate the secondary data sets and/or indicators corresponding to such secondary data visualizations may be displayed. Multiple visualizations and/or indicators may be displayed, and the user may select one for viewing. The selected secondary data visualization may then be used as the basis of another iteration to automate suggestions of tertiary data visualizations, from which the user may select one (or more) for viewing, and so on.

The criteria may be used to determine whether a secondary data set should be the basis of a suggestion to the user. The criteria may include, but are not limited to, any of a variety of determinations, including:

- a determination that the secondary data set includes at least some of the data values of the primary data set;
- a determination that the secondary data set does not include more than a maximum number of data values;
- a determination that the secondary data set does not include fewer than a minimum number of data values;
- a determination that the secondary data includes data values that are dimensions;
- a determination that the secondary data set includes data values that are of a data type different from that of data values of the primary data set;
- a determination that the secondary data set includes data values with descriptors different from that of data values of the primary data set;
- a determination that the secondary data set includes data values contained within a previous data set graphically illustrated by a previous data visualization previously selected for viewing by the user; and
- a determination that the secondary data set includes data values with data parameters that are the same as those of data values of a previous data set graphically illustrated by a previous data visualization previously selected for viewing by the user.

In at least one embodiment, the system of the present invention may monitor what a user actually selects from the suggestions made by the system. The user's selections may then be incorporated into the criteria to help the system provide improved suggestions and/or to move the suggestions that are more frequently selected to more prominent display locations.

In some embodiments, an analysis path may be recorded to enable the user to easily view the decisions made and/or the data visualizations viewed. A playback user interface may display decision records, and may receive user input to display resources such as data visualizations used in the analysis and/or enable such resources to easily be published in a manner that facilitates sharing and/or further review.

Further details and variations are described herein.

BRIEF DESCRIPTION OF THE DRAWINGS

The accompanying drawings illustrate several embodiments of the invention. Together with the description, they serve to explain the principles of the invention according to the embodiments. One skilled in the art will recognize that the particular embodiments illustrated in the drawings are merely exemplary, and are not intended to limit the scope of the present invention.

FIG. 6 is a schematic block diagram illustrating the database of FIGS. 1A and 1B with the metadata, shown in the form of a chart, which may be included among the various data sets of the database.

FIG. 8 is a chart illustrating the metadata that may remain after initial application of the criteria as set forth above.

DETAILED DESCRIPTION OF THE EMBODIMENTS

For illustrative purposes, the methods described and depicted herein may refer to automated provision of suggestions for data visualizations and/or other resources that may facilitate an analysis being carried out by a user. Provision of suggestions may include automatically displaying data visualizations and/or indicators that can be selected by the user to display the corresponding data visualizations. The data visualizations may, in some embodiments, relate to the operation of an enterprise. One skilled in the art will recognize that the techniques of the present invention can be applied to many different types of data visualizations and/or other analytical resources, and may apply to many different situations apart from the exemplary enterprise operation context mentioned previously.

System Architecture

According to various embodiments, the present invention can be implemented on any electronic device equipped to receive, store, and present information. Such an electronic device may be, for example, a desktop computer, laptop computer, smartphone, tablet computer, or the like.

Although the invention is described herein in connection with an implementation in a computer, one skilled in the art will recognize that the techniques of the present invention can be implemented in other contexts, and indeed in any suitable device capable of receiving and/or processing user input. Accordingly, the following description is intended to illustrate various embodiments of the invention by way of example, rather than to limit the scope of the claimed invention.

Figure 1A:
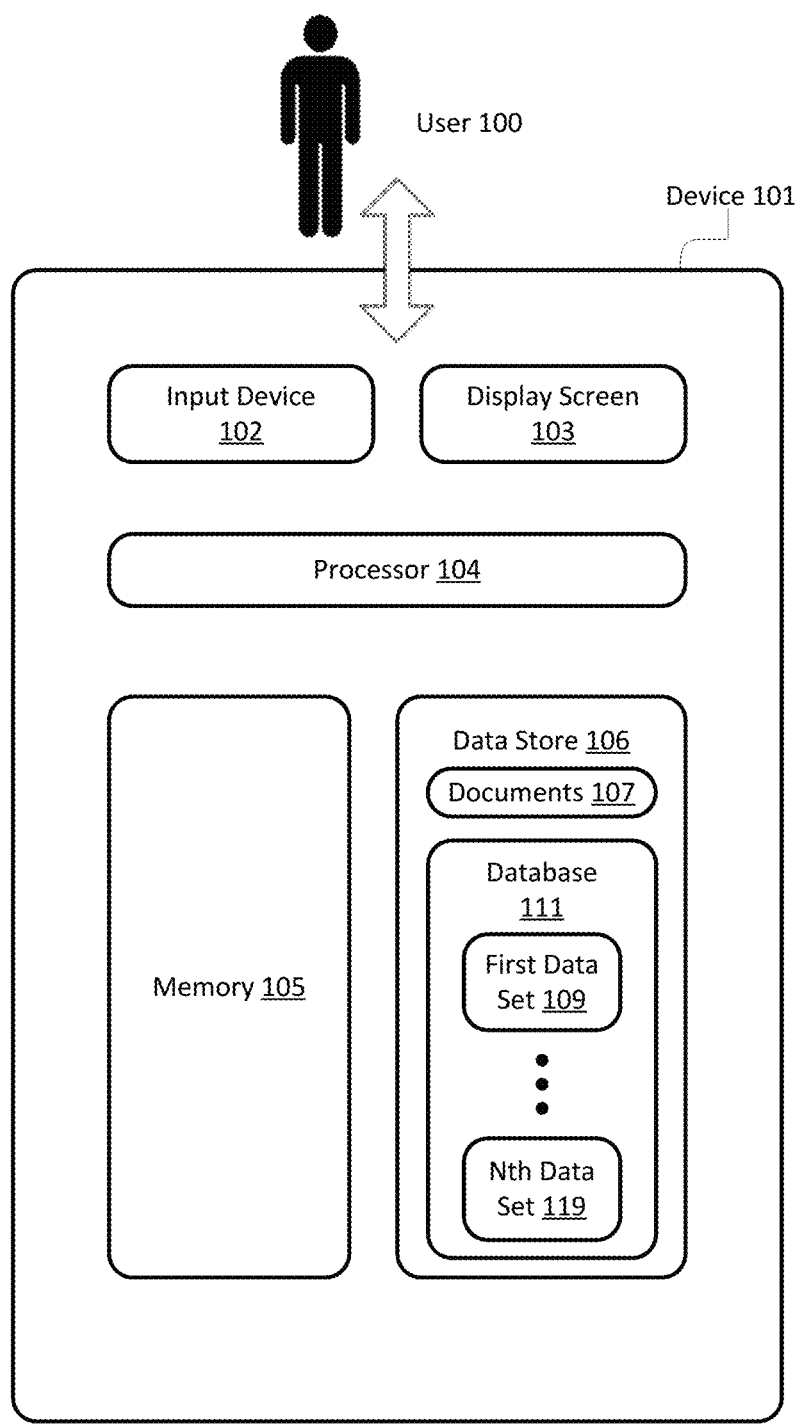
FIG. 1A is a block diagram depicting a hardware architecture for practicing the present invention according to one embodiment of the present invention.

Referring now to FIG. 1A, there is shown a block diagram depicting a hardware architecture for practicing the present invention, according to one embodiment. Such an architecture can be used, for example, for implementing the techniques of the present invention in a computer or other device 101. Device 101 may be any electronic device equipped to receive, store, and/or present information, and to receive user input in connect with such information.

In at least one embodiment, device 101 has a number of hardware components well known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Data store 106 can be any magnetic, optical, or electronic storage device for data in digital form; examples include flash memory, magnetic hard drive, CD-ROM, DVD-ROM, or the like. In at least one embodiment, data store 106 stores information which may include documents 107 and/or one or more databases, referred to collectively as a database 111, that can be utilized and/or displayed according to the techniques of the present invention, as described below. In another embodiment, documents 107 and/or database 111 can be stored elsewhere, and retrieved by device 101 when needed for presentation to user 100. Database 111 may include one or more data sets, including a first data set 109, and optionally, a plurality of additional data sets up to an nth data set 119.

Display screen 103 can be any element that graphically displays documents 107, database 111, and/or the results of steps performed on documents 107 and/or database 111 to provide data output incident to presentation and/or analysis of data and/or data visualizations. Such data output may include, for example, data visualizations, navigational elements, graphical elements drawing attention to data visualizations or graphical elements, queries requesting confirmation and/or parameters for information identification, display, or presentation, or the like. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, or by any other appropriate means. This communication with other electronic devices is provided as an example and is not necessary to practice the invention.

In at least one embodiment, data store 106 is detachable in the form of a CD-ROM, DVD, flash drive, USB hard drive, or the like. Documents 107 and/or database 111 can be entered from a source outside of device 101 into a data store 106 that is detachable, and later displayed after the data store 106 is connected to device 101. In another embodiment, data store 106 is fixed within device 101.

Figure 1B:
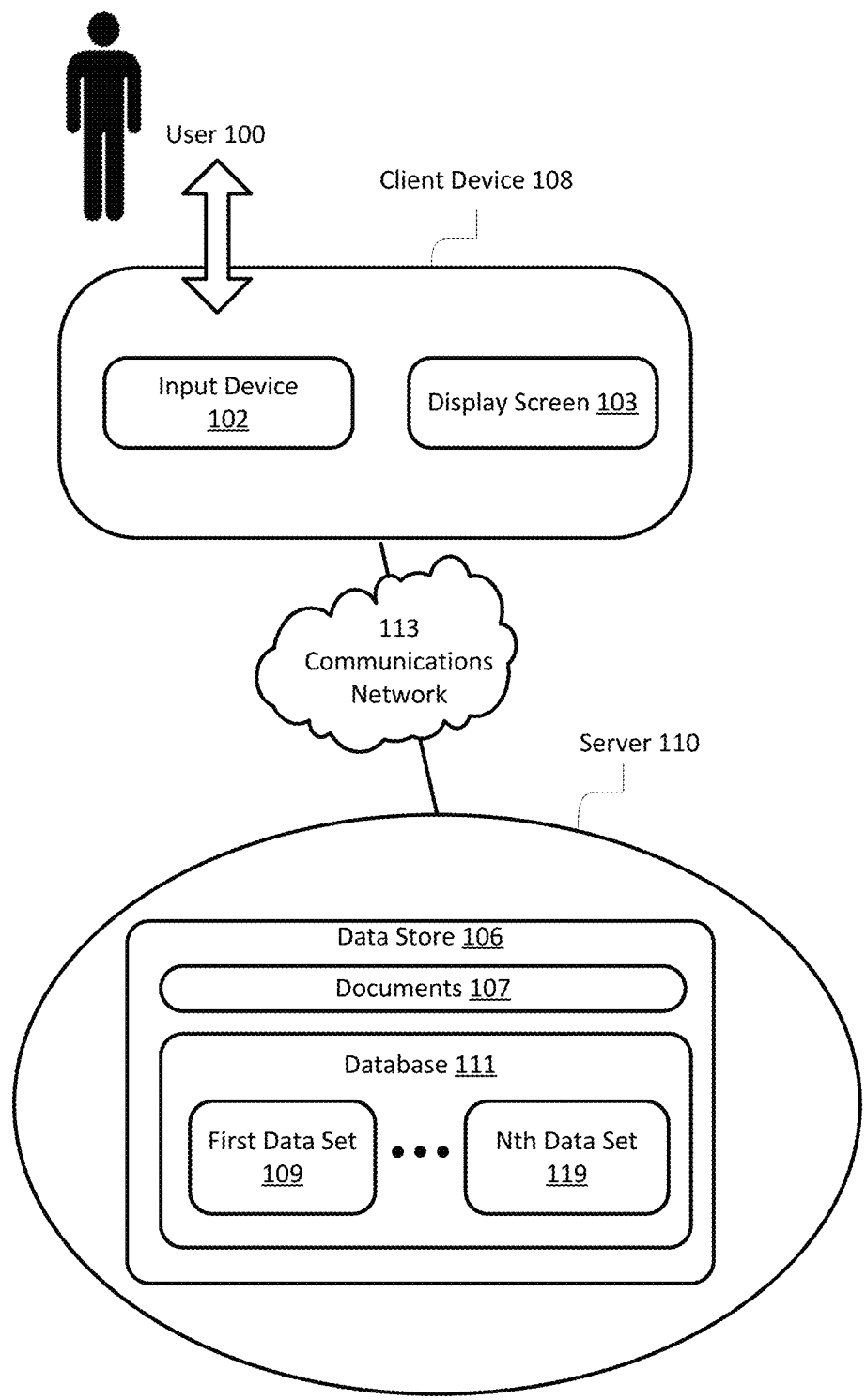
FIG. 1B is a block diagram depicting a hardware architecture for practicing the present invention in a client/server environment, according to one embodiment of the present invention.

Referring now to FIG. 1B, there is shown a block diagram depicting a hardware architecture for practicing the present invention in a client/server environment, according to one embodiment of the present invention. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Documents 107, data, and/or database 111 can be presented as part of such web pages and/or other web-based resources, using known protocols and languages such as Hypertext Markup Language (HTML), Java, JavaScript, and the like.

Client device 108 can be any electronic device incorporating the input device 102 and/or display screen 103, such as a desktop computer, laptop computer, personal digital assistant (PDA), cellular telephone, smartphone, music player, handheld computer, tablet computer, kiosk, game system, or the like. Any suitable type of communications network 113, such as the Internet, can be used as the mechanism for transmitting data between client device 108 and server 110, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 113, and receives responses from server 110 containing the requested data.

In this implementation, server 110 is responsible for data storage and processing, and incorporates data store 106 for storing documents 107 and/or database 111. Server 110 may include additional components as needed for retrieving data and/or database 111 from data store 106 in response to requests from client device 108.

In at least one embodiment, documents 107 are organized into one or more well-ordered data sets, with one or more data entries in each set. Data store 106, however, can have any suitable structure. Accordingly, the particular organization of documents 107 within data store 106 need not resemble the form in which documents 107 are displayed to user 100. In at least one embodiment, an identifying label is also stored along with each data entry, to be displayed along with each data entry.

In at least one embodiment, database 111 is organized in a file system within data store 106. Appropriate indexing can be provided to associate particular documents with particular quantitative data elements, reports, other documents, and/or the like. Database 111 may include any of a wide variety of data structures known in the database arts. As in FIG. 1A, database 111 may include one or more data sets, including a first data set 109, and optionally, a plurality of additional data sets up to an nth data set 119.

Documents 107 can be retrieved from client-based or server-based data store 106, and/or from any other source. In at least one embodiment, input device 102 is configured to receive data entries from user 100, to be added to documents 107 held in data store 106. User 100 may provide such data entries via the hardware and software components described above according to means that are well known to those skilled in the art.

Display screen 103 can be any element that graphically displays documents 107, database 111, and/or the results of steps performed on the information in documents 107 and/or database 111 to provide data output incident to presentation and/or analysis of data and/or data visualizations. Such data output may include, for example, data visualizations, navigational elements, graphical elements drawing attention to data visualizations or graphical elements, queries requesting confirmation and/or parameters for information identification, display, or presentation, or the like. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. In at least one embodiment where only some of the desired output is presented at a time, a dynamic control, such as a scrolling mechanism, may be available via input device 102 to change which information is currently displayed, and/or to alter the manner in which the information is displayed.

In at least one embodiment, the information displayed on display screen 103 may include data in text and/or graphical form. Such data may comprise visual cues, such as height, distance, and/or area, to convey the value of each data entry. In at least one embodiment, labels accompany data entries on display screen 103, or can be displayed when user 100 taps on or clicks on a data entry, or causes an onscreen cursor to hover over a data entry.

Furthermore, as described in more detail below, display screen 103 can selectively present a wide variety of data related to identification and/or presentation and/or analysis of data and/or data visualizations. In particular, as described herein, user 100 can provide input, such as a selection from a menu containing a variety of options, to determine the various characteristics of the information presented such as the type, scope, and/or format of the information to be displayed on display screen 103.

In one embodiment, the system can be implemented as software written in any suitable computer programming language, whether in a standalone or client/server architecture. Alternatively, it may be implemented and/or embedded in hardware.

Data Set and Visualization Structure

In general, a data set may include one or more pieces of data. Each piece of data may be of any desired length and format. Thus, each piece of data may be a character string, integer, floating point number, or any other type of data, and may thus represent any information such as names, times, dates, currency amounts, percentages, fractions, physical dimensions, or any other data that may desirably be stored in a computer.

In some instances, a data set may be stored as an array or with any other storage structure known in the art. A data set may have only a single data series (for example, a quantity measured at a constant time interval, with no attached date information). Alternatively, a data set may have two data series (for example, a quantity measured daily, with the date also stored in association with each daily measurement). Yet further, a data set may have more than two data series (for example, multiple different quantities measured daily, with the date also stored in association with each set of daily measurements).

Figure 2:
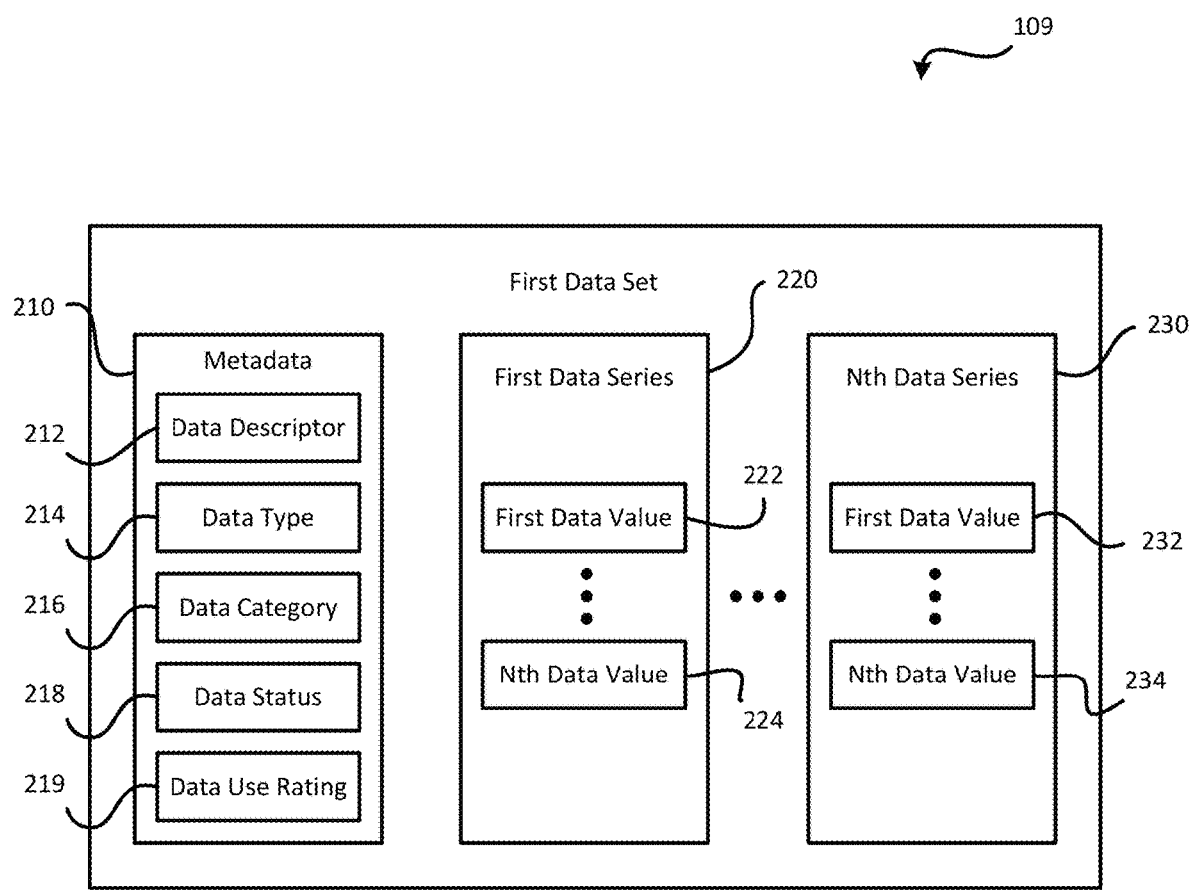
FIG. 2 is a block diagram depicting the structure of a data set according to one embodiment of the present invention.

FIG. 2 is a block diagram depicting the structure of a data set according to one embodiment of the present invention. The data set of FIG. 2 may be, for example, the first data set 109 of FIG. 1A and FIG. 1B.

The first data set 109 may have metadata 210 that provides helpful information about the data stored in the first data set 109. The metadata 210 may permit a user or program to obtain information about the data stored within the first data set 109 without retrieving and/or analyzing any of the data itself. Thus, the metadata 210 may optionally include, but need not be limited to, data parameters such as a data descriptor 212, a data type 214, a data category 216, a data status 218, and a data use rating 219 of the data within the first data set 109.

The metadata 210 may also include other characteristics of the data of the first data set 109 that are not specifically shown in FIG. 2. Further, each element recited above may include multiple pieces of information; for example, the data of the first data set 109 may fall within more than one data type. Thus, for example, the data type 214 of the metadata 210 may include more than one item if the data within the first data set 109 is of multiple types. Further, the data descriptor 212, a data type 214, a data category 216, a data status 218, and a data use rating 219 may include information specific to individual data series or even individual data values. Hence, the various elements of the metadata 210 may be broken down by data series within the first data set 109.

The data descriptor 212 may include a name or other descriptive term applied to the data of the first data set 109. For example, "order date," "profit," and "customer name" are descriptors that may be stored within the data descriptor 212. If desired, the data descriptor 212 may contain information that is likely to be helpful to the user 100 as the user 100 attempts to ascertain and/or utilize the contents of the first data set 109.

The data type 214 may relate to whether the data represents a currency, date, character string, or the like. Further, the data type 214 may optionally provide more detailed information on what the data represents. For example, the data type 214 may specify that data in the first data set 109 are character strings with relevance to the northwestern region of the U.S.

The data category 216 may include any grouping that can include one or more data sets. The data categories 216 may include multiple categories, as a single data set, data series, or data value may belong to multiple categories. The data categories 216 may relate to geography, chronology, business units, types of products or services, or any other useful grouping. Thus, for example, if the first data set 109 provides shoe sales revenue in Colorado broken down by month in the year 2010, the data categories 216 may include items such as "revenue," "Colorado," "footwear," "2013," and the like. The data categories 216 may be automatically determined via keyword or other analysis of the other metadata 210 or other data of the first data set 109 and/or selected by the user 100 or another individual, for example, via dropdown menus. If desired, policies may be established by the user 100 or other individuals to guide automated determination of the data categories 216.

In some embodiments, the data category 216 may indicate whether the data of the first data set relates to "measures" or "dimensions." In general, a "measure" may be a property on which calculations can be made, while a "dimension" may be data that can be used for structured labeling of measures.

Thus, a "measure" may specify an item being measured. Examples of measures may include hires, employees, absences, bonuses, budgets, learning opportunities, and the like. A "dimension" may specify what subset of an item is being measured. Examples of dimensions include by location, by age group, by gender, by year, by month, current status, and the like.

According to one example, a set of rules may be used to define which data values of a data set (such as the first data set 109) are dimensions and which data values of the data set are measures. One example of such a set of rules is as follows:

Any data value that represents a date may be categorized as a dimension.

Any data value that does not represent a date but is alpha-numeric may also be categorized as a dimension.

Any data value that is numeric and does not have a name (such as a data descriptor 212) that includes "ID," "type," "group," "category," or a similar identifier may be categorized as a measure.

Any data value that is numeric and does not have less than a number of distinct values, such as twenty distinct values, may be categorized as a measure.

Any calculation on the number of items of a particular dimension within a data set, may be categorized as a measure. For example, a count of locations or a count of distinct types may be categorized as a measure.

These rules are merely exemplary. Such a rule set may grow in sophistication over time. In at least one embodiment, machine learning techniques and/or other techniques may be used to automatically grow, refine, and/or otherwise develop the rule set used to determine the data category 216 of a data set according to the invention. Further, any set of rules may be used to determine the manner in which data of a data set (such as the first data set 109) are categorized. Further, a wide variety of categories may be used in addition to or in the alternative to dimensions and measures.

The data status 218 may indicate the status of the data of the first data set 109 within the analysis being currently conducted. For example, the data status 218 may indicate whether the data are shown in the data visualization currently being viewed by the user 100. Additionally or alternatively, the data status 218 may indicate whether the data are part of a previous step in the analysis, or provide similar information.

The data use rating 219 may relate to whether the data of the first data set 109 have been selected by the user 100 in the present analysis and/or a previously-conducted analysis, either directly or via selection of a data visualization that illustrates the data. The data use rating 219 may be binary (i.e., "yes" or "no" to indicate whether or not the user 100 has selected the data before). Alternatively, the data use rating 219 may be a value that indicates the frequency with which the data have been selected, the number of times the data have been selected, or the like.

The metadata 210 may have other metadata elements in addition to or in place of those shown in FIG. 2. If desired, other metadata elements may specify relationships between the data of the first data set 109 and other data sets, data visualizations, and/or users. Additionally, the metadata 210 may optionally include the source system of the data, keyword tags of the data, department names to which the data relate, and/or user data such as the business owner, the visualization creator, and/or the person responsible for the data.

In addition to the metadata 210, the first data set 109 may have one or more data series. Thus, the first data set 109 may have a first data series 220, and optionally, additional data series up to an nth data series 230. The first data series 220 may have one or more pieces of data, starting with a first data value 222 and optionally, terminating with an nth data value 224. Similarly, the nth data series 230 may have one or more pieces of data starting with a first data value 232 and, optionally, terminating with an nth data value 234.

A data visualization may include any of a wide variety of ways to represent the data of a data set to facilitate viewing, comprehension, and/or analysis by the user. Thus, a data visualization may include a chart, graph, infographic, map, or any other data representation. The device 101 and/or the client device 108 may facilitate creation of a data visualization of each of the data sets within the database 111, from the first data set 109 up to the nth data set 119.

Figure 3:
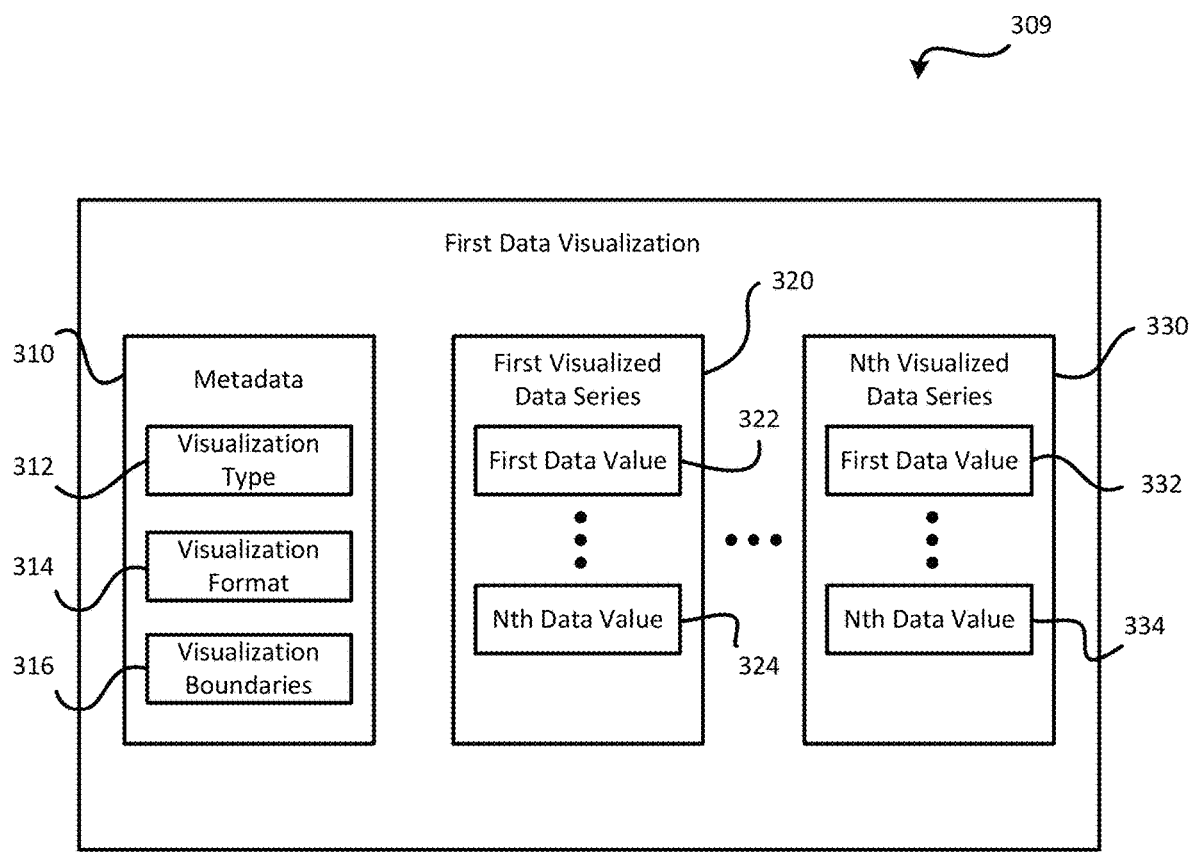
FIG. 3 is a block diagram depicting the structure of a data visualization according to one embodiment of the present invention.

FIG. 3 is a block diagram depicting the structure of a data visualization according to one embodiment of the present invention. The data visualization shown may be a first data visualization 309 based on the first data set 109. Thus, the first data visualization 309 may facilitate viewing, comprehension, and/or analysis of the first data set 109 by the user 100.

Numerical, textual, and/or symbolic values may be represented in data visualizations using any suitable visual schema, including but not limited to numbers, charts, graphs, data tables. Further, numerical values may be represented using infographics that encode quantitative value using one or more visual object attributes such as object size, area, length, saturation, or count. Any suitable combination thereof can be provided. Similarly, values that are textual or based on other characters and/or symbols may be presented in a wide variety of data visualizations.

The first data visualization 309 may have metadata 310, which may also include information regarding the first data visualization 309 and/or the data illustrated by the first data visualization 309. Thus, the metadata 310 may optionally include, but need not be limited to, a visualization type 312, a visualization format 314, and/or visualization boundaries 316. Additionally or alternatively, the metadata 310 of the first data visualization 309 may also include the items present in the metadata 210 for the first data set 109.

The visualization type 312 may specify whether the first data visualization 309 is a chart, graph, infographic, map, or other visualization type. The visualization type 312 may provide further detail about the first data visualization 309 such as, in the case of a graph, whether the graph is a line graph, bar graph, 3D graph, etc. If desired, the visualization type 312 may further provide information regarding the data presented by the first data visualization, such as the data type 214 of the first data set 109 on which the first data visualization 309 is based.

The visualization format 314 may provide more detailed information regarding the manner in which the first data visualization 309 is formatted. For example, the visualization format 314 may specify which data series of the first data set 109 is shown on each axis of a chart, specify the colors, fonts, and/or shapes to be used for each data series on a map, or the like.

The visualization boundaries 316 may indicate the limits of the first data visualization 309. For example, if the first data visualization 309 is a map, the visualization boundaries 316 may indicate the extents of the map. If the first data visualization 309 is a graph, the visualization boundaries 316 may indicate the end points of each axis.

The various components of the metadata 310, including the visualization type 312, the visualization format 314, and the visualization boundaries 316 may be based on user selections made in the creation of the first data visualization 309. Additionally or alternatively, the metadata 310 may include one or more parameters automatically determined by the device 101 and/or the client device 108 during the creation of the first data visualization 309. In the alternative, the metadata 310 may be omitted, and the information from the metadata 310 may be obtained from the data presented by the first data visualization 309.

The first data visualization 309 may also have a first visualized data series 320 and an nth visualized data series 330, which may correspond to the first data series 220 and the nth data series 230 of the first data set 109. Thus, the first visualized data series 320 may have a first data value 322 and, optionally, additional data values up to an nth value 324. Similarly, the second visualized data series 330 may have a first data value 332 and, optionally, additional data values up to an nth data value 334. The data values of the first visualized data series 320 and the second visualized data series 330 may be the same as (i.e., copies of) those of the first data series 220 and the nth data series 230 of the first data set 109, respectively. In the alternative, the first data visualization 309 need not contain the first visualized data series 320 and the second visualized data series 330, but may instead link directly to the first data series 220 and the nth data series 230 of the first data set 109.

The device 101 and/or the client device 108 may facilitate creation of one or more data visualizations for each data set of the database 111. Thus, in addition to the first data visualization 309, there may be one or more data visualizations, up to an nth data visualization (not shown) corresponding to the nth data set 119. These data visualizations may be present on the display screen 103 and/or within a document of documents 107, or may be located elsewhere within the data store 106. The display screen 103 may show the data visualizations singly or in groups.

If desired, the data visualizations may be displayed by an analysis program running on the device 101 and/or the client device 108. The analysis program may permit interactive navigation, for example, by permitting the user 100 to select a data visualization to adjust the manner in which it is displayed and/or navigate to related data.

Advantageously, the analysis program may help the user 100 to find a helpful drill path by providing suggestions as to what resources the user could beneficially review as part of the analysis. Such an analysis program may, for example, automatically provide one or more suggested data visualizations that relate to the data visualization currently being viewed and/or analyzed. The suggestions may be based on criteria that help the analysis program to enhance the likelihood that the suggestions will be helpful to the user 100. One exemplary system that may be used to implement this method will be shown and described subsequently.

Conceptual Architecture

In at least one embodiment, the system of the present invention enables automated suggestion of one or more secondary data sets that may be of interest to a user by displaying one or more secondary data visualizations that graphically illustrate the secondary data sets and/or navigational elements that can be used to navigate to the secondary data visualizations. The secondary data sets may be identified by applying criteria to a database to locate data sets that match a set of criteria and then using data sets that satisfy the criteria as secondary data sets that form the basis of suggestions to the user 100.

Figure 4:
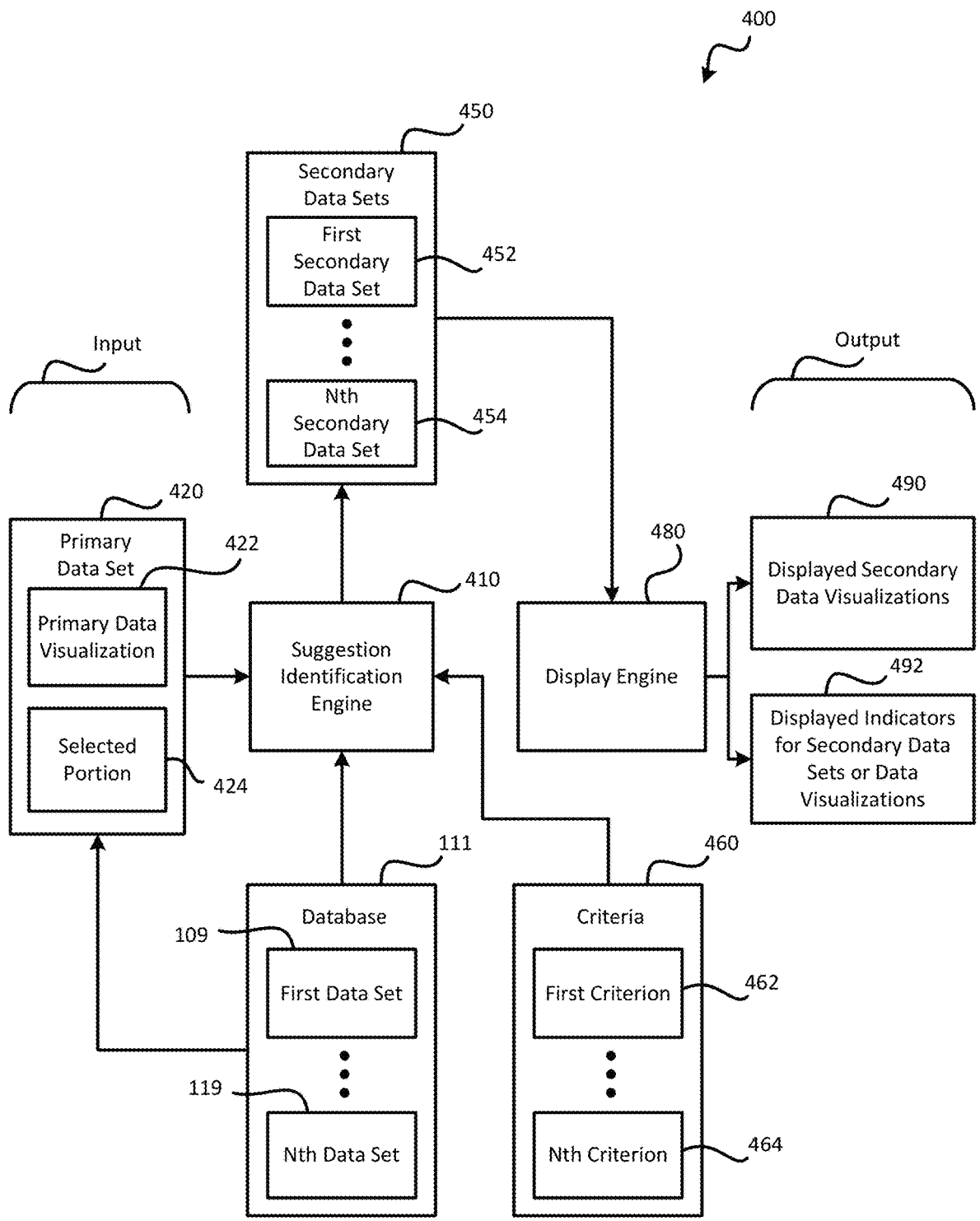
FIG. 4 is a block diagram depicting a system for carrying out automatic data suggestion, according to one embodiment of the present invention.

FIG. 4 is a block diagram depicting a system 400 for carrying out automatic data suggestion, according to one embodiment of the present invention. As shown, the system 400 may have a suggestion identification engine 410 that receives various inputs and, based on those inputs, identifies the related information.

More specifically, the system 400 may receive one or more inputs, which may include a primary data set 420 that is under current review by the user 100. The primary data set 420 may be from the database 111 and may, for example, have been retrieved from the database 111 through a previously executed query, drill path step, or the like.

The primary data set 420 may be displayed for the user 100 in the form of a primary data visualization 422. A portion of the primary data set 420 may optionally be selected by the user 100 to define a selected portion 424. This selection may be made, for example, by selecting a portion of the primary data visualization 422 (for example, selecting a bar in a bar chart or a wedge in a pie chart). The selected portion 424 may indicate a subset of the primary data set 420 on which the user 100 wishes to focus further analysis. The suggestion identification engine 410 may receive and utilize the primary data set 420 to initiate the process of suggesting one or more secondary data sets for further analysis.

In alternative embodiments, the suggestion identification engine 410 may receive other inputs. Such other inputs may include, but are not limited to, explicit user input such as queries, pre-established user preferences, results or steps of previous analysis projects, and the like.

According to some examples, the primary data set 420 may be selected for viewing and/or analysis by the user 100 via the input device 102. Any known method of providing input may be used, including pointing, tapping, typing, dragging, and/or speech. As mentioned previously, in alternative embodiments, more than one primary data set may be selected. Once the user 100 begins to view or use the primary data set 420, the suggestion identification engine 410 may commence formulating suggestions for new drill paths such as further analysis steps.

The suggestion identification engine 410 may use the primary data set 420 as the basis for formulation of suggestions for further analysis steps. Thus, the suggestion identification engine 410 may use the primary data set 420 to suggest secondary data sets 450 that may beneficially be viewed and/or analyzed by the user 100 to advance the analysis being undertaken relative to the primary data set 420. The secondary data sets 450 may include one or more secondary data sets. More specifically, the secondary data sets 450 may include a first secondary data set 452 and optionally, one or more additional secondary data sets up to an nth secondary data set 454.

The secondary data sets 450 may reside within the database 111, and may be identified and/or retrieved by the suggestion identification engine 410. In some embodiments, the secondary data sets 450 may be identified by applying criteria 460 to the database 111 to determine which data sets, of the first data set 109 through the nth data set 119, might beneficially be reviewed by the user 100. The data sets of the first data set 109 through the nth data set 119 that meet the criteria may be retrieved from the database 111 and used as the secondary data sets 450 to be suggested to the user 100.

The criteria 460 may include a first criterion 462 and optionally, one or more additional criteria up to an nth criterion 464. The criteria may include, but are not limited to, any of a variety of determinations, including:

1) A determination that the secondary data set includes at least some of the data values of the primary data set;
2) A determination that the secondary data set does not include more than a maximum number of data values;
3) A determination that the secondary data set does not include fewer than a minimum number of data values;
4) A determination that the secondary data includes data values that are dimensions;
5) A determination that the secondary data set includes data values that are of a data type different from that of data values of the primary data set;
6) A determination that the secondary data set includes data values with descriptors different from that of data values of the primary data set;
7) A determination that the secondary data set includes data values contained within a previous data set graphically illustrated by a previous data visualization previously selected for viewing by the user; and
8) A determination that the secondary data set includes data values with data parameters that are the same as those of data values of a previous data set graphically illustrated by a previous data visualization previously selected for viewing by the user.

Regarding the first exemplary criterion listed above, it may be useful for secondary data sets 450 and/or corresponding secondary data visualizations to be suggested to a user to be useful pivots of the primary data set. A criterion requiring that the secondary data sets include some of the data of the primary data set 420 and/or some of the data shown in the primary data visualization 422 may help to ensure that the secondary data sets 450 are sufficiently connected to the primary data set 420 to provide a logical analytical step for the user 100.

Regarding the second exemplary criterion listed above, it may be difficult for large amounts of data to be rapidly viewed and understood by a user, particularly in the context of a data visualization. Thus, a criterion that imposes a maximum number of data values in the secondary data sets 450 may help to ensure that the secondary data sets 450 are readily understandable and usable by the user 100 without requiring the user 100 to navigate through large amounts of data, much of which may not be relevant to the analysis being carried out. The maximum number of data values permissible may depend on the type of data visualization to be used to present the data set under consideration to the user 100.

Regarding the third exemplary criterion listed above, it may not be helpful for the user to be presented with secondary data sets that include too few data values to be of use. A certain amount of granularity may be needed in a body of data in order for it to convey sufficient information to be useful. Thus, a minimum number of data values may be imposed. As with the second criterion, the minimum number of data values permissible may depend on the type of data visualization to be used to present the data set under consideration to the user 100.

Regarding the fourth exemplary criterion listed above, it may be helpful, as a data pivot of the primary data set 420, to ensure that the secondary data sets 450 include at least one new dimension. This may help to ensure that the secondary data sets 450 are distinct enough from the primary data set 420 to embody significant steps forward in the analysis. Further, a change in dimensions between the primary data set 420 and the secondary data sets 450 may help ensure that the secondary data sets 450 are useful pivots of the primary data set 420.

Regarding the fifth exemplary criterion listed above, it may be helpful to ensure that the data types of the secondary data sets 450 are distinct from those of the primary data set 420. The data types of this criterion may be those of the data type 214 of FIG. 2. For example, if the primary data set 420 provides data regarding sales broken down by date, secondary data sets 450 that have data values that are not based on dates may generally be more useful as pivots of the primary data set 420.

Regarding the sixth exemplary criterion listed above, ensuring that the secondary data sets 450 have descriptors different from those of the primary data set 420 may also help to ensure that the secondary data sets 450 are sufficiently distinct from the primary data set 420. The data descriptors of this criterion may be those of the data descriptor 212 of FIG. 2. For example, if the primary data set 420 provides data values with a descriptor "order date," data values with different descriptors may be more likely to provide distinct information, and may thus be more helpful in the secondary data sets 450. This criterion may simply require that the data descriptors 212 of the primary data set 420 and the secondary data sets 450 be non-identical. Alternatively, this criterion may require that the data descriptors 212 have no single word in common. As another alternative, this criterion may require that the data descriptors 212 do not have the same or similar meanings. Synonyms, categories, and/or other linguistic tools may be used to make such a comparison.

Regarding the seventh exemplary criterion listed above, data values that were part of previously selected data sets may have a higher likelihood of being of interest to the user. Thus, the secondary data sets 450 may advantageously be required to contain data values that have previously been selected by the user. Alternatively, the opposite limitation may be imposed, i.e., requiring the secondary data sets 450 to have data values that have not previously been suggested and/or selected, to ensure that the user 100 is always being presented with information that has not been seen by and/or suggested to the user 100 before.

Regarding the eighth exemplary criterion listed above, it may be advantageous for the secondary data sets 450 to have one or more data parameters in common with data sets previously selected by the user 100. Such data parameters may include, but need not be limited to, the data parameters of the metadata 210 of the data sets. This may help ensure that the secondary data sets 450 contain data most likely to be relevant to the user 100. However, as with the seventh exemplary criterion listed above, the opposite limitation may alternatively be imposed to help ensure that the user 100 is presented with information that has not been seen by and/or suggested to the user 100 before.

Any of the criteria 460 set forth above may be applied to make comparisons between the data set of the database 111 under review and the primary data set 420. Alternatively, any of the criteria 460 may instead be used to compare the data set under review with the secondary data sets 450 that have already been identified for suggestion to the user 100. Thus, the system 400 may ensure that the various suggestions made to the user 100 are not too redundant. As another alternative, any of the criteria 460 may instead be used to compare the data set under review with data sets that have been suggested to the user 100, retrieved by the user 100, and/or selected by the user 100 in the past. Thus, the system 400 may be used to help the user 100 avoid retracing his or her steps.

However, in some embodiments, the user 100 may wish to retrace his or her steps. The manner in which the criteria 460 are applied may be adjusted to help accomplish this. Additionally or alternatively, the analysis path taken by the user 100 may be recorded for playback for the user 100. This will be shown and described in detail in connection with examples to be presented subsequently.

The criteria 460 listed above are merely exemplary; those of skill in the art, with the aid of the present disclosure, will recognize that a wide variety of other criteria may be applied to identify data sets within the database 111 with a high likelihood of relevance to an analysis being conducted by the user 100.

The criteria 460 may be applied in a wide variety of ways. According to one example, the criteria 460 may be applied as rules that exclude data sets of the database 111. Thus, in order to be identified as one of the secondary data sets 450 to be suggested to the user 100, a data set of the database 111 may be required to meet all of the criteria 460. In such a case, the criteria 460 may be applied in binary fashion, with a data set either meeting or failing to meet each of the criteria.

Additionally or alternatively, the criteria 460 may be applied in a numerical fashion, for example, to assign a score to each data set of the database 111. Each of the criteria 460 may have multiple levels of conformance, with a higher level of conformance having a higher point value or a higher score than a lower level of conformance. The scores for all of the criteria 460 may be added together for each data set of the database 111 to provide an overall score for each data set. In the event that some of the criteria 460 are deemed more important than others, a weight factor or other numerical adjustment may be assigned to each criterion and used to adjust the impact of the score for that criterion on the overall score for a data set. The top-scoring data sets may then be identified as secondary data sets 450 to be suggested to the user 100. The number of secondary data sets 450 to be suggested to the user 100 may be limited to a certain number, a certain minimum score, or the like.

Additionally or alternatively, the criteria 460 may be applied in a variety of other ways. For example, binary elimination and/or scoring methods may be combined. One way in which this may be done is to eliminate data sets that fail to meet some of the criteria 460, and then score the remaining data sets.

If desired, the suggestion identification engine 410 may provide the user 100 with the ability to customize the manner in which the criteria 460 are applied. For example, the user 100 may select which of the criteria 460 should be applied and/or select weight factors indicating the importance of each of the criteria 460. Additionally or alternatively, the user 100 may tune each of the criteria 460 to determine how the criteria 460 will be applied. For example, the user 100 may indicate whether the sixth exemplary criterion listed above should require that the data descriptors 212 of the primary data set 420 and the secondary data sets 450 be non-identical, or simply require that the data descriptors 212 have no single word in common.

The secondary data sets 450 identified by the suggestion identification engine 410 as being of potential value to the analysis being conducted may be retrieved from the corresponding data sets of the database 111. Notably, it may not be necessary to retrieve a portion of the secondary data sets 450 because some data values of the secondary data sets 450 may already be present in the view currently displayed for the user 100 and/or related views.

Once all of the secondary data sets 450 have been obtained, a display engine 480 may display the secondary data sets 450, corresponding data visualizations, and/or corresponding indicators on the display screen 103. This display may be the output of the system 400.

If desired, the display engine 480 may display the secondary data sets 450. However, it may be more helpful for the user 100 to see data visualizations based on the secondary data sets 450. Thus, the display engine 480 may generate and/or provide displayed secondary data visualizations 490 for the user by displaying data visualizations based on the secondary data sets 450 directly on the display screen.

As another alternative, the display engine 480 may provide displayed indicators 492, each of which represents one of the secondary data sets 450 and/or the corresponding secondary data visualization. Such indicators may include text, images, animations, or the like. If desired, the displayed indicators 492 may take the form of graphical indicators that illustrate the corresponding secondary data visualizations in graphical form. Further, the displayed indicators 492 may be reduced images (i.e., thumbnail images) of the corresponding secondary data visualizations.

Optionally, such indicators may serve as navigational elements that can be used to navigate to and view the secondary data sets 450 and/or corresponding secondary data visualizations. For example, the indicators may be links and/or icons that can be selected, for example, via the click of a mouse, to initiate display of the corresponding secondary data set 450 and/or the corresponding secondary data visualization.

One of skill in the art will recognize that the display engine 480 may display data, data visualizations, indicators, and/or navigational elements not specifically set forth in the description above. Exemplary versions of the displayed secondary data visualizations 490 and the displayed indicators 492 will be shown and described in greater detail subsequently in connection with examples.

Automatic Data Set Suggestion

Figure 5:
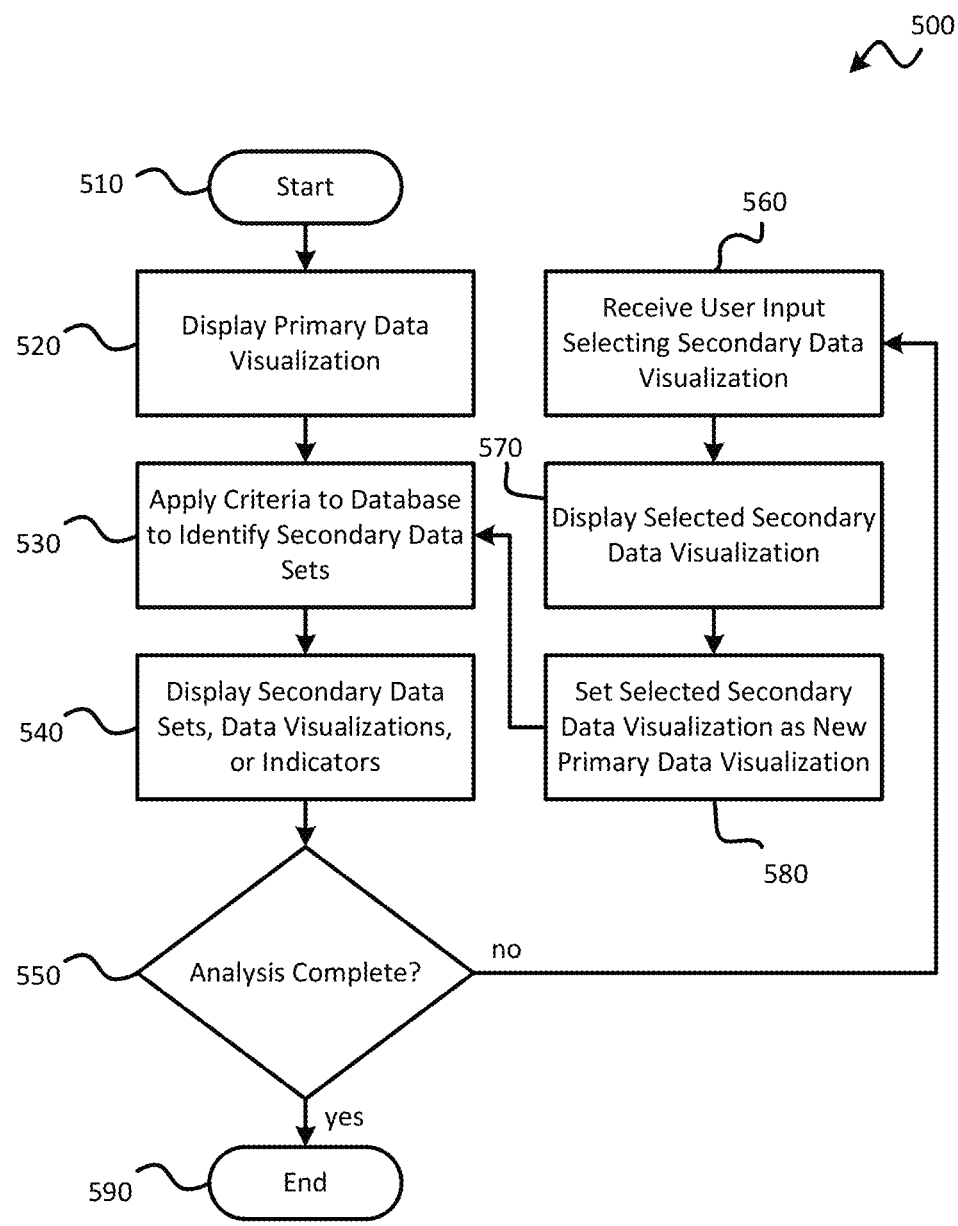
FIG. 5 is a flowchart depicting a method of automatic suggestion provision according to one embodiment of the present invention.

FIG. 5 is a flowchart depicting a method 500 of automatic suggestion provision according to one embodiment of the present invention. The method 500 may be carried out, at least in part, by the system 400 as in FIG. 4, or with a differently-configured suggestion provision system. The method 500 may be performed in connection with input from a user; such a user may be a developer, customer, enterprise leader, sales representative for business intelligence services, or any other individual. FIG. 5 illustrates a series of steps in a certain order, but those of skill in the art will recognize that these steps may be re-ordered, omitted, replaced with other steps, or supplemented with additional steps, consistent with the spirit of the invention.

The method 500 may start 510 with a step 520 in which the primary data visualization 422 is displayed for the user 100, for example, on the display screen 103. This may be done, for example, in response to receipt of a user input selecting the primary data visualization 422 for display. Display of the primary data visualization 422 may be initiated by the user, for example, by selecting the primary data visualization 422 from a document, communication, or the like. Alternatively, the user 100 may select the primary data set 420 and request the creation of the primary data visualization 422.

Once the primary data visualization 422 has been displayed, the method 500 may proceed to a step 530 in which the criteria 460 are applied to the database 111 to identify the secondary data sets 450. This may be done as set forth above. Advantageously, application of the criteria 460 to the database 111 and identification of the secondary data sets 450 may be carried out by the system 400 in the background while the user 100 performs other tasks. Thus, the user may view, change, annotate, and/or otherwise use the primary data set 420 while the system 400 identifies the secondary data sets 450 to be suggested to the user 100.

Once the secondary data sets 450 have been identified, the method 500 may proceed to a step 540 in which the display engine 480 is used to display the secondary data sets 450, the corresponding data visualizations, and/or the corresponding indicators. As mentioned previously, the data of each secondary data sets 450 may be displayed in raw form, or in a corresponding data visualization. Alternatively, an indicator, such as a thumbnail image of the corresponding secondary data visualization, may be shown. The secondary data sets 450, corresponding secondary data visualizations, and/or corresponding indicators may, if desired, be displayed simultaneously and arranged in a manner that allows the user 100 to easily select one to be displayed and/or used for further analysis.

Once the secondary data sets 450, the corresponding data visualizations, and/or the corresponding indicators have been displayed, the method 500 may proceed to a query 550 in which a determination is made as to whether the analysis is complete. This determination may be made through receipt of input from the user 100 indicating that the analysis project is complete or no further automated suggestions are desired, through detection that the user 100 is no longer active (for example, by detecting that the user 100 has not selected any of the displayed secondary data sets 450, corresponding data visualizations, and/or the corresponding indicators), through closure of the analysis program, and/or in a variety of other ways.

If the analysis is complete, the method 500 may end 590. If the analysis is not complete, the method 500 may instead proceed to a step 560 in which the system 400 receives user input, for example, via the input device 102, selecting one of the displayed secondary data sets 450, corresponding data visualizations, and/or the corresponding indicators.

Then, in a step 570, the selected secondary data visualization, or the secondary data visualization corresponding to the selected secondary data set 450 or the selected indicators, may be displayed in a step 570. The selected secondary data visualization may be displayed in place of or in addition to the primary data set 420. The user 100 may now wish to focus his or her analysis on the displayed secondary data visualization.

Hence, the method 500 may then proceed to a step 580 in which the selected secondary data visualization is set as the new primary data set 420. The method 500 may then automatically provide suggestions related to the new primary data set 420. Thus, the method 500 may return to the step 530 in which the criteria 460 are applied to the database 111 to identify the secondary data sets 450 that may be of value to the user as further analysis steps are undertaken. The method 500 may continue in this manner until the analysis is complete, and then end 590.

Many variations of the method 500 may be carried out by a wide variety of systems according to the invention. Various implementations of the method 500 will now be discussed in connection with examples.

Automatic Data Set Suggestion Examples

A wide variety of data sets, criteria, data visualizations, information displays, and other aspects may be varied to generate a wide variety of embodiments of the invention.

The following examples are presented by way of illustration and not limitation to indicate some of the ways in which a system, such as the system 400 of FIG. 4, may automatically suggest and/or present the data sets, data visualizations, and/or indicators to a user 100.

FIG. 6 is a schematic block diagram illustrating the database 111 with the metadata 210, shown in the form of a chart 600, which may be included among the various data sets (i.e., the first data set 109 through the nth data set 119) of the database 111. As shown in the chart 600, the metadata 210 may include the data descriptor 212, the data type 214, the data category 216, and the data status 218 applicable to each of the data sets. The data use rating 219 has been omitted from this example. The "yes" and "no" entries for the data status 218 may relate to whether or not the data set is currently shown in the primary data visualization.

Figure 7:
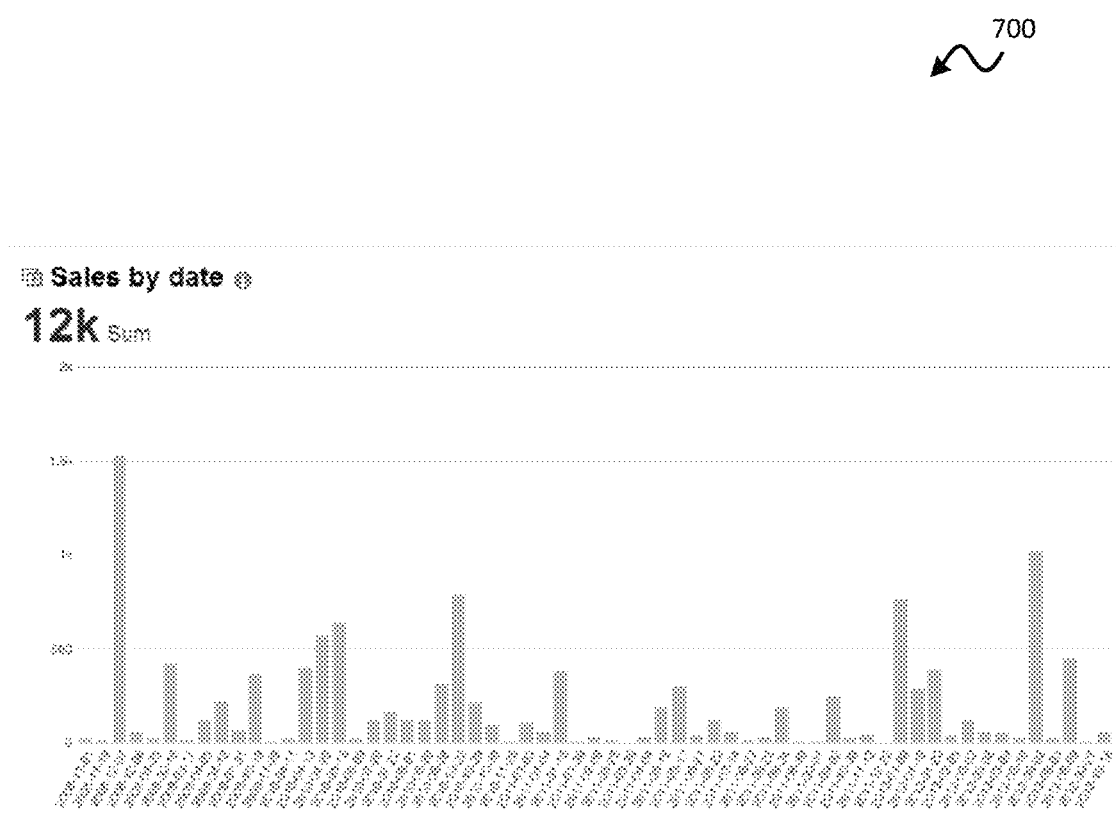
FIG. 7 is a bar chart showing a primary data visualization generated from the data sets of FIG. 6 in which the data status is "yes."

FIG. 7 is a chart 700 in the form of a bar chart showing a primary data visualization generated from the data sets of FIG. 6 in which the data status 218 is "yes." Thus, the chart 700 may show sales by date. In at least one embodiment, the system 400 of the present invention may apply the criteria 460 by, first, selecting the first n dimensions that are not already included in the chart and then excluding "duplicate" dimensions.

For example, data sets with a data type 214 of "Date" such as that labeled "Ship Date" may be excluded because in the chart 700, a data set with a data type 214 of "Date" ("Order Date") was used in the chart 700. "Order Date" and "Sales" may also be excluded from the corresponding secondary data set 450 because they have a data status 218 of "yes," indicating that they are already present within the primary data visualization 422. Similarly, the data descriptor 212 "Customer State" and "Zip Code" may both relate to locations; therefore, only one of the two may be included in the secondary data sets 450.

In addition, the system 400 of the present invention may further reduce the data sets used for the secondary data sets 450 based on data descriptors 212 that are similar or include similar text. For example, data sets with the data descriptor 212 "Product Subcategory" or "Product Container" may be excluded because one or more other data sets with the data descriptor 212 "Product Category" are already present in the database 111.

Additionally, all data sets with the data category 216 of "Measure" may be excluded. This may be done so that the measure ("Sales") of the primary data visualization 422 may also be used for the secondary data visualizations. Thus, each of the secondary data visualizations may use at least some of the data of the primary data set 420. This may help maintain continuity between the primary data visualization 422 and the secondary data visualizations.

FIG. 8 is a chart 800 illustrating the metadata 210 that may remain after initial application of the criteria 460 as set forth above. The only data descriptors 212 in the remaining data sets may be "Order Priority," "Ship Mode," "Customer Name," "Customer State," Region Customer Segment," and "Product Category," as shown.

Application of the criteria 460 may be deemed complete at this point, or may continue. According to one example, the display engine 480 may create charts based on the same measure of the primary data visualization 422 (i.e., the chart 700 of FIG. 7), which is "Sales." Thus, the display engine 480 may create charts for each of the following:

Sales by Order Priority
Sales by Ship Mode
Sales by Customer Name
Sales by Customer State
Sales by Region Customer Segment
Sales by Product Category Each chart may be a secondary data visualization in the form of a sample drill-down visualization, or "drill." In the alternative to using the same measure as the primary data visualization 422, different measures may be used. In alternative examples, one or more dimensions may be kept the same as those of the primary data visualization 422, while a different measure may be used.

From the charts created above, the system 400 may determine that "Sales by Customer Name" would return too many data points for a meaningful visualization. Hence, data sets with the data descriptor 212 "Sales by Customer Name" may be removed from the list. This may leave five automatically generated drill paths, as follows:

Sales by Order Priority
Sales by Ship Mode
Sales by Customer State
Sales by Region Customer Segment
Sales by Product Category The system 400, and more specifically, the display engine 480, may automatically create indicators for these five drill paths. If desired, they may take the form of miniature, i.e., "thumbnail," images of the charts. These will be shown in FIG. 9.

Figure 9:
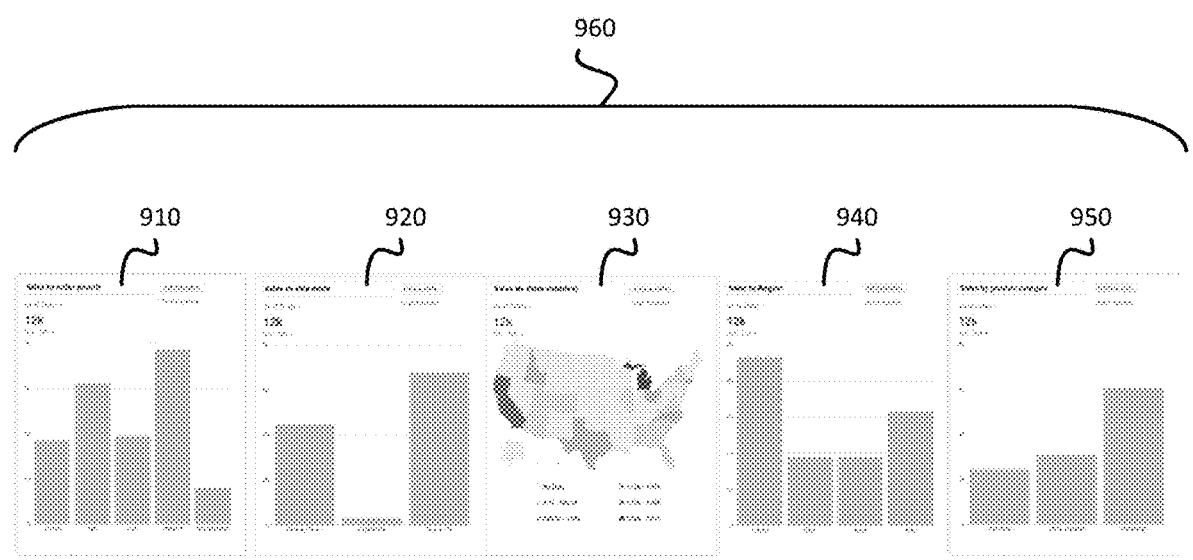
FIG. 9 illustrates a series of charts that may be generated by the display engine of the system of FIG. 4.

FIG. 9 illustrates a series of charts that may be generated by the display engine 480 of the system 400. The charts may include a Sales by Order Priority chart 910, a Sales by Ship Mode chart 920, a Sales by Customer State chart 930, a Sales by Region Customer Segment chart 940, and a Sales by Product Category chart 950. Each of the charts 910, 920, 930, 940, 950 may be viewable in full-size, but may additionally or alternatively be displayed in miniature to serve as indicators 960 as shown in FIG. 9.

Such indicators 960 may be displayed, for example, along the top, bottom, left-hand side, and/or right-hand side of the screen, alongside the primary data visualization 422. According to one example, the indicators 960 may be arranged horizontally in the manner shown in FIG. 9, under the primary data visualization 422 on the display screen 103. Thus, the indicators 960 may be displayed without disrupting the ability of the user 100 to focus on the primary data visualization 422 and continue the analysis work he or she is performing.

If desired, the indicators 960 may serve as links that enable the user 100 to easily navigate to a full-size version of the corresponding chart. For example, the user 100 may click on the Sales by Order Priority chart 910 of the indicators 960 to display the Sales by Order Priority chart 910 full-size. This action may make the Sales by Order Priority chart 910 the new primary data visualization 422. Thus, the method 500 may operate to identify new secondary data sets 450 of the database 111 that may provide logical next steps in the analysis work to be done, as indicated in the method 500 of FIG. 5.

In the alternative to graphical indicators, the display engine 480 may display the secondary data sets 450 in a variety of different ways. According to one example, the display engine 480 may display indicators that are textual. Alternatively, graphical indicators may be displayed that are not thumbnail images, but instead include icons and/or other conceptual representations of the data within the secondary data sets 450.

Analysis Path Recording

As mentioned previously, the steps of an analysis path, or drill path, are often not recoverable unless the user has taken the time to keep careful records of the analysis. Users of analysis software often have a difficult time remembering the analysis path they took to come to a certain conclusion. Analysis often starts with a question, and, when an answer is found, leads to another question. Often the analysis includes a path that follows one branch of questions and answers, only to discover that that branch leads to an incorrect conclusion; typically, the user then backtracks and proceeds down a different branch of questions and answers.

It may be useful for users to see a history of which branches were followed, and in what sequence. Various embodiments of the present invention provide mechanisms for storing and playing back an analysis path, reviewing an analysis path, presenting such a path in a presentation format, and/or to add annotations anywhere in the flow so that the user can present an analysis story to others. Additionally or alternatively, the present invention may enable the user to review a previously recorded drill path and alter decisions made in the recording. The recording of the drill path may optionally be revised to incorporate the new decision.

Some features available in some embodiments of the present invention may include the ability to do any or all of the following for each step (or a group of steps) of the analysis path:
  Replay an analysis path;
  Add narrative to a replay of a path;
  Replay the salient parts of an analysis path;
  Share an analysis path or narrative with others; and
  Learn when someone's analysis path uncovered a significant opportunity.

The techniques of the present invention can therefore allow a user to view previously performed analysis paths, and/or to help others come to the same conclusions as the user. This will be shown and described in connection with FIG. 10.

Figure 10:
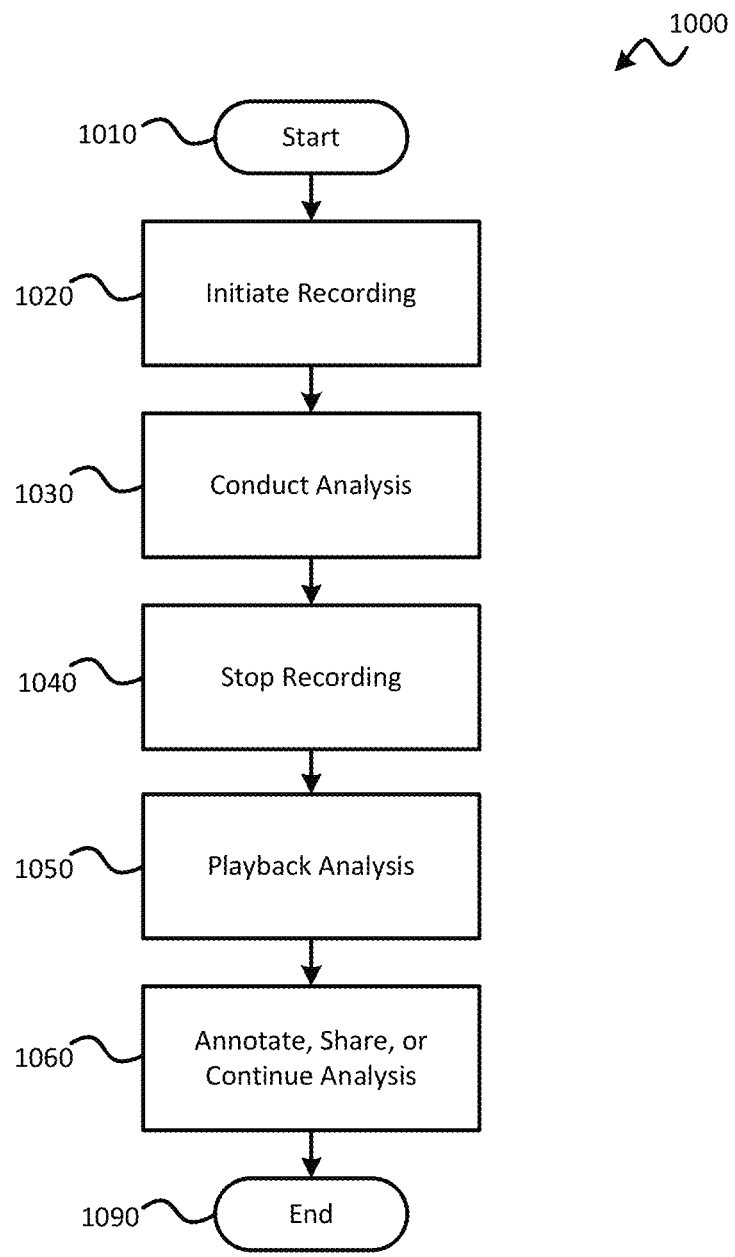
FIG. 10 illustrates a method for conducting an analysis with recordation, according to one embodiment of the invention.

FIG. 10 illustrates a method 1000 for conducting an analysis with recordation according to one embodiment of the invention. As shown, the method 1000 may start 1010 with a step 1020 in which recording is initiated. This may be done, for example, with an analysis recording module available within an analysis program such as a business intelligence system. Such a module may have a "record" button or other feature that can be activated by the user 100 to initiate recording of future analysis steps. Alternatively, recording may occur automatically, for example, when the user 100 opens the analysis program or commences an analysis project.

Once the recording has been initiated, the method 1000 may proceed to a step 1030 in which the analysis is conducted. This may be done, for example, with the benefit of automated data set suggestion, as set forth in the preceding description. Thus, the step 1030 may entail performance of the method 500 of FIG. 5, or any alternative method of providing automated drill path suggestion within the scope of the invention.

Once the analysis is complete, the method 1000 may proceed to a step 1040 in which the recording is stopped. The recorded analysis may be stored in any suitable location, such as in the data store 106. The recorded analysis may be available for future use.

In a step 1050, the recorded analysis may be played back, for example, in the analysis program used to conduct the analysis, or in a separate program. From the playback of the analysis, the user 100 may, in a step 1060, perform various tasks such as annotating or sharing part or all of the recorded analysis, or continuing the analysis, for example, to pursue drill paths that were not explored in the original analysis. The method 1000 may then end 1090.

In at least one embodiment, the system of the present invention may be implemented using at least three user interface elements—a "History Bar," an "Analysis Content Area," and a record button.

The History Bar may contain "analysis state objects," which may be indicators such as thumbnail representations of what a user has done. When a user activates recording, for example, by selecting a "record" button inside the analysis application, each step in the user's path may be published to the history area as an analysis state object. The history area may be scrollable and/or able to handle any number of elements such that a user can have any number of items in an analysis path story. The Analysis Content Area may include information associated with the analysis that is contained in discrete user action states.

In another embodiment, for every session in an analysis, a user's entire history and/or any analysis path steps may be preserved. For example, an automatic session history may be enabled, allowing the user to record specific subsections of the analysis history within a given session. The analysis application may save session histories over an extended period of time so that a user may go back to a previous session to understand the analysis. An entire analysis history session (or a portion thereof) may be published as an analysis playback publication. In at least one embodiment, once a user wants to create a publication, he or she may drag the analysis state object into the playback publication area and add as many states as desired.

In at least one embodiment, website history can be added to the analysis path playback via a browser plug-in that allows recording of cross-site activity within a single browser window. In at least one embodiment, a user enables history capture of external web sites by agreeing to record URL history or browser state history across multiple sites and allowing each new website visited to be added to the web browsing history. The states of external websites can be presented as regular browser history states.

Analysis Path Recording Examples

In at least one embodiment, the system of the present invention may allow a user to review his/her analysis history, to present that history in a presentation format, and to add annotations anywhere in the flow so that the user can present an analysis story to others. For example, as part of the user's analysis, the user may:
  Jump from an analysis application out to a web page;
  Pick a view in the playback history;
  Edit the history;
  Save a drill path for future drilling;
  Add content between flows for a guided story; and
  Navigate backwards and forwards through a drill path to see content with which the user has previously interacted.

In general, analysis applications may have different states depending on the stage of analysis. For example, upon being presented with a data visualization, a user may drill into the details of one aspect of that visualization to be presented with another data visualization. The user may then select related visualizations to see how events or measures correlate with other measures. Each step in such an analysis path may have the following stages:
  1) The user is presented with a visualization;
  2) The user tries to comprehend the visualization; and
  3) Once the user has enough understanding of the data presented, he or she asks another question and either tries to find a visualization that will answer the question or applies one or more filters to the current visualization to answer the question.

The steps may be repeated any number of times. Each action or step in such an analysis path can be used as a component of a larger analysis story.

Analysis paths often include information dead ends, requiring the user to step back to the previous analysis step to answer the same question differently or ask a different question. In many cases, such dead end paths are important to overall understanding of a problem and may be useful in telling the story of how a person came to a certain conclusion.

As part of the analysis path, an analysis application may not present all of the information needed to understand information about the question asked. Users will often reference web material via a search or go to a known website to gather more data and ask more questions. Each of the searches or steps in going to an external web site may also be used as components in a larger analysis story.

In at least one embodiment, the analysis application may present a display of analysis steps in a selection view. Such steps may include selections of data sets, data visualizations, web sites, documents, multimedia files, and/or any other resource used by the user 100. Items presented as part of a displayed history can represent UI elements that were selected to get to particular analysis results, as well as the results themselves. Alternatively, the history items can represent the results of each individual step of the analysis.

In at least one embodiment, the display may present a content area representing a linear time flow. Analysis history steps may be dragged into this content area to create an analysis story. The user may insert commentary, annotations, and/or other content not part of the historical analysis in order to include content for the questions they were asking that may not be captured by the history flow. In at least one embodiment, once an analysis story has been created, it may be published in any of a variety of ways, including for example and without limitation, presentation software format, a large wall display, as a public link to a slideshow-like presentation where users may collaborate around the analysis story, and/or the like. This publication may also later be used as an element in another analysis path playback publication.

In at least one embodiment, a user may turn on analysis path playback while an analysis is in progress. This may enable capture of a section of analysis or to select elements to be added to an analysis playback publication.

Analysis history items may be presented in any suitable format; in at least one embodiment, such items are displayed as thumbnail-sized images, along with history indicators to show how to get back to previous drill states. In at least one embodiment, addable content may be in any suitable format, such as for example: text, images, URLs, and movies.

The analysis playback history may also allow a user to return to a previous point in an analysis path and then choose a different path, resulting in a tree-like navigation structure. During the playback creation stage or mode, the user may have the option to select the entire playback history or the critical path from beginning to end.

In at least one embodiment, a user may "tear off" the current state of a graph and place it in an analysis playback container. For example, when a user drills into the details or filters data on a data visualization, the user can use a gesture or control to tear off the current visualization, place it in another container, and continue with his or her analysis.

Figure 11:
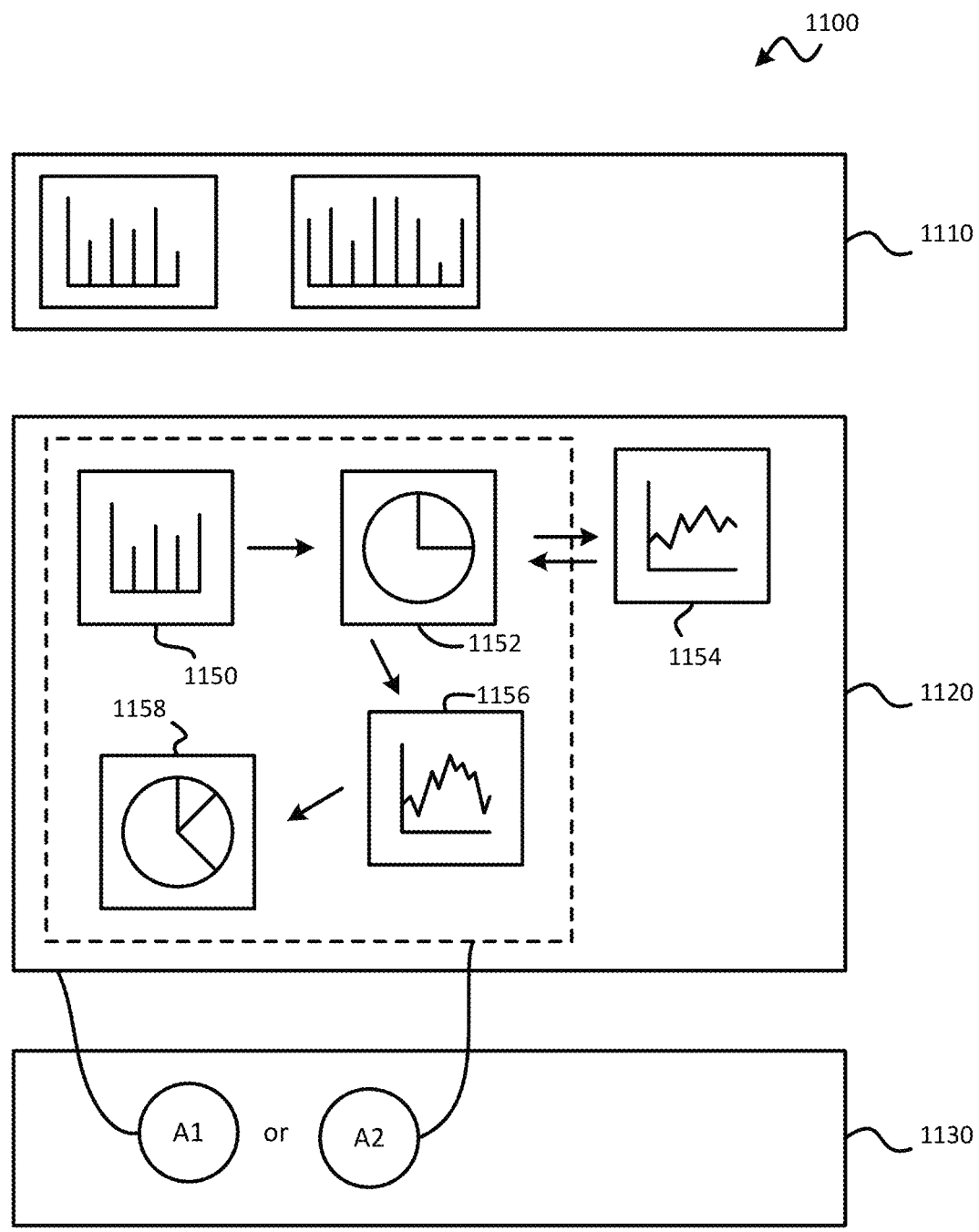
FIG. 11 is an exemplary user interface with recordation illustrating one example of how a user can select history items for inclusion in a new publication.

FIG. 11 is an exemplary user interface 1100 with recordation illustrating one example of how a user can select history items for inclusion in a new publication. The user interface 1100 may include an analysis playback history area 1110, a current analysis area 1120, and a publication creation area 1130.

The current analysis area may contain a plurality of thumbnail images 1150, 1152, 1154, 1156, 1158, which may represent each stage in the analysis path followed by the user 100. Starting at a first step represented by the thumbnail image 1150, the user 100 may selects a drilldown path or filter to arrive at a second step represented by the thumbnail image 1152. The user 100 may then filter again to arrive at a third step, represented by the thumbnail image 1154. The user 100 may then realize that the third step did not answer the question that is the basis of the analysis, so he or she may return to the second step (the thumbnail image 1152) and select a different path, which may lead to a fourth step represented by the thumbnail image 1156, and ultimately, to a fifth step represented by the thumbnail image 1158

The publication creation area 1130 may be a location where the user 100 can include content for publication. The user 100 may select any one or more of the analysis steps represented by the thumbnail images 1150, 1152, 1154, 1156, 1158 for publication. Thus, for example, the user 100 may select all of the steps in the analysis carried out in the current analysis area 1120, as represented by "A1." Alternatively, the user 100 may elect to omit the analysis step represented by the thumbnail image 1154 because it is not part of the analysis path that led to the conclusion of the analysis. This is represented by "A2." The interface may present shortcut options to include the shortest path from beginning to end of analysis, as in A2, and/or the entire analysis path, U-turn decision points, and/or most frequently visited analysis stages, as in A1.

Figure 12:
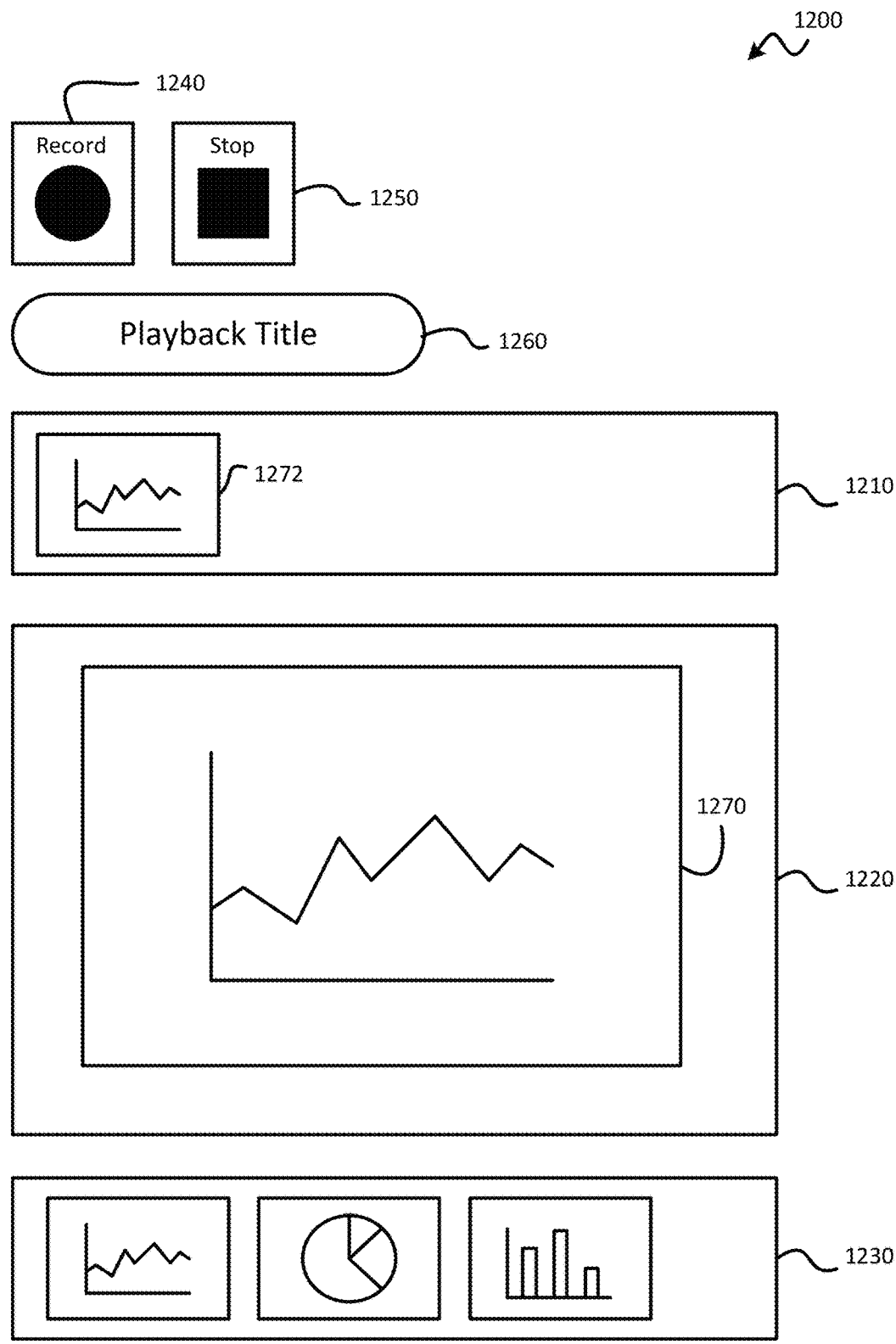
FIGS. 12, 13, 14, and 15 illustrate a user interface with recordation according to another exemplary embodiment of the present invention.

FIGS. 12, 13, 14, and 15 illustrate a user interface 1200 with recordation according to another exemplary embodiment of the present invention. As shown in FIG. 12, the user interface 1200 may have an analysis playback history area 1210, a current analysis area 1220, and a related items area 1230. Additionally, the user interface 1200 may have a record button 1240, a stop button 1250, and a playback title button 1260.

In FIG. 12, the user 100 may select the record button 1240 to begin recording analysis path stages. The current analysis area 1220 may contain the content (i.e., a data visualization 1270) the user was viewing when pressing the record button 1240. A thumbnail representation of this current analysis step, labeled 1272, may appear in the analysis playback history area 1210.

Figure 13:
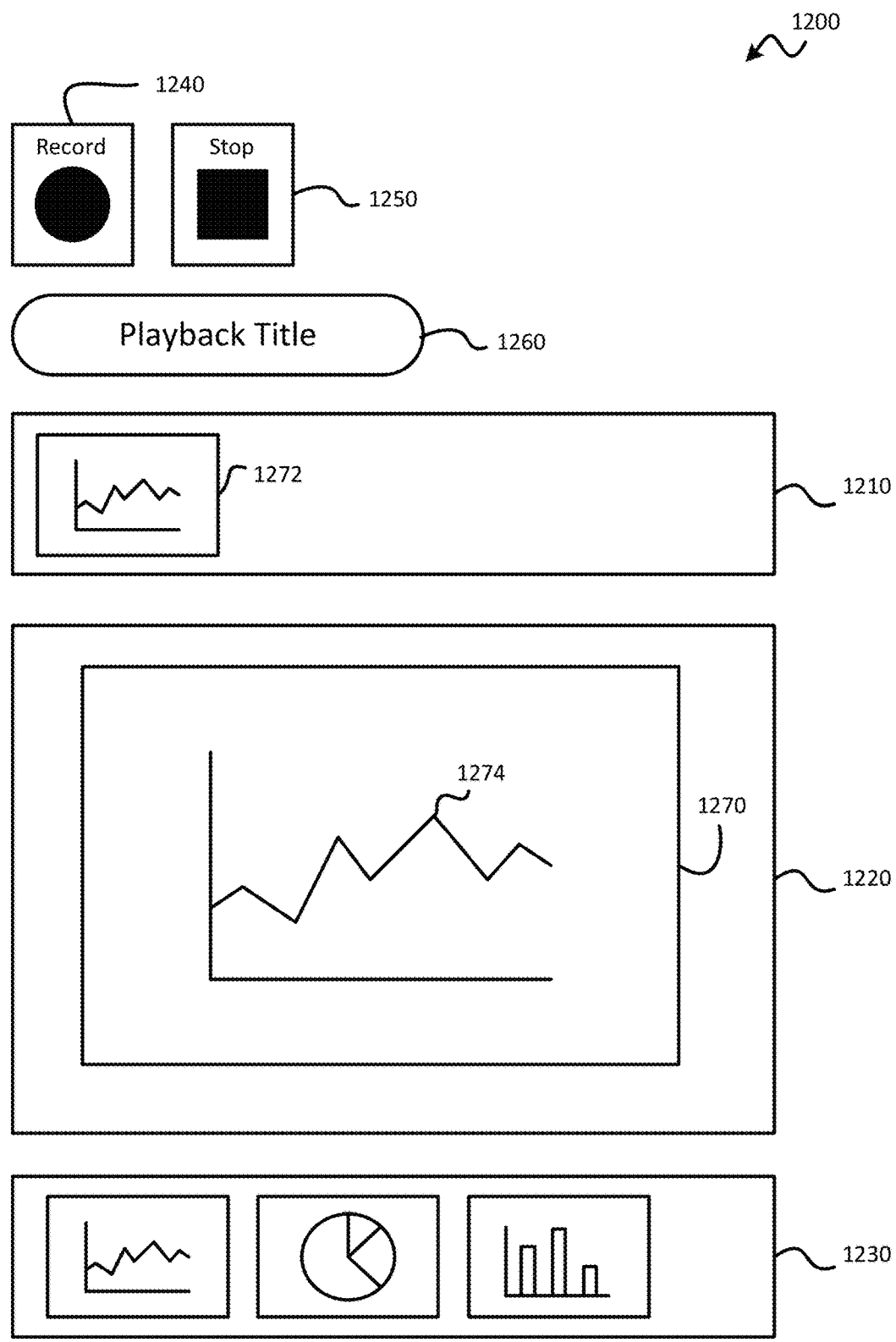

In FIG. 13, the user 100 may filter or drill down to more detail in the current chart by clicking on a data point, labeled 1274. This may initiate transition to the view of FIG. 14.

Figure 14:
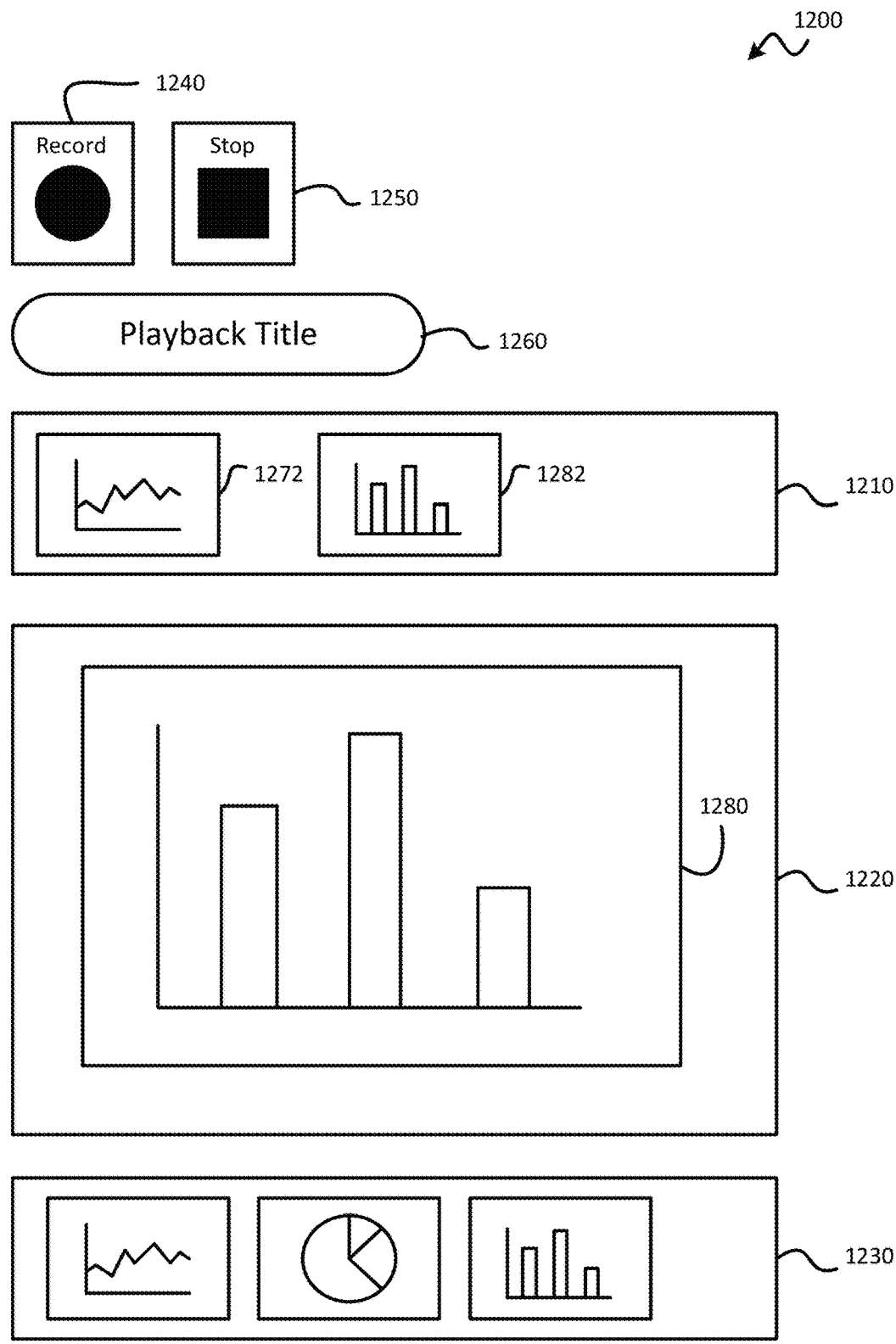

In FIG. 14, a bar chart 1280, may be displayed as the result of the filter or drill down action taken in FIG. 13. The bar chart 1280 may be automatically represented as a thumbnail in the Analysis Playback History area as the next step of recorded analysis. This is labeled 1282.

Figure 15:
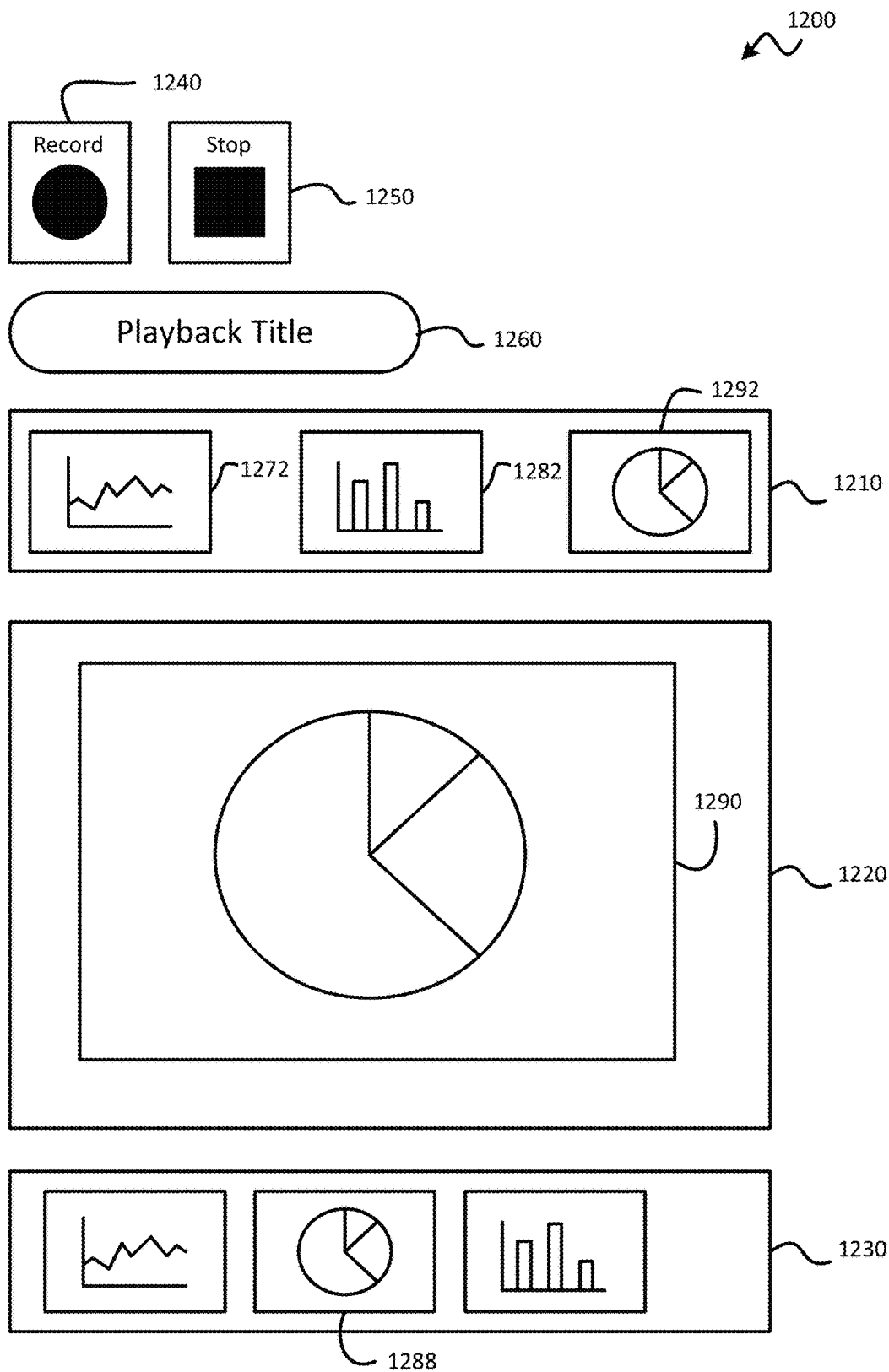

FIG. 15 represents an example of adding content from the related items area 1230 of the user interface 1200. The user 100 may select an item 1288 from this area, bringing it to focus in the current analysis area 1220 (shown as item number 1290), and also automatically adding a thumbnail representation, labeled 1292, in the analysis playback history area 1210. When the user 100 is done recording, he or she may click the stop button 1250 to stop automatically adding analysis steps into the analysis playback history area

1210. However, if desired, the user 100 may continue to add content manually by dragging elements from either the current analysis area 1220 or the related items area 1230 into the analysis playback history area 1210. Additionally or alternatively, the user interface 1200 my present a menu or other actionable item to add content to the analysis playback history area 1210.

If desired, the various stages of analysis shown in the analysis playback history area 1210 may be automatically placed in an analysis path publication. The user interface 1200 may have functionality that enables the user 100 to remove stages of the analysis prior to publication. The analysis path may then be saved to a desired location, exported for use in a document, shared with other individuals, or the like.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics of the invention.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment of the invention. The appearances of the phrases "in one embodiment" or "in at least one embodiment" in various places in the specification are not necessarily all referring to the same embodiment.

In various embodiments, the present invention can be implemented as a system or a method for performing the above-described techniques, either singly or in any combination. In another embodiment, the present invention can be implemented as a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the invention include: a mobile phone, personal digital assistant, smartphone, kiosk, server computer, enterprise computing device, desktop computer, laptop computer, tablet computer, consumer electronic device, or the like. An electronic device for implementing the present invention may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method, comprising:
    at an input device, receiving, from a user, a first user input selecting a primary data visualization;
    at a display device, responsive to receipt of the first user input, displaying a graphical user interface including the primary data visualization, the primary data visualization graphically illustrating a primary data set from a database;
    at a processor, responsive to receipt of the first user input,
        automatically identifying a data field in the database that meets one or more predefined relevance criteria for a secondary data set, the one or more predefined relevance criteria specifying relevance of data values of the secondary data set to the primary data set; and
        retrieving data values of the data field from the database to obtain the secondary data set;
    automatically displaying, in the graphical user interface in association with the primary data visualization, a secondary graphical representation for the secondary data set for selection by the user to further analyze a different aspect of the primary data set of the primary data visualization;
    responsive to automatically displaying the secondary graphical representation for the secondary data set, receiving, at the input device, a second user input selecting the secondary graphical representation for further analysis of the different aspect of the primary data set represented by the secondary graphical representation;
    at the display device, responsive to receipt of the second user input, displaying a secondary data visualization graphically illustrating the secondary data set;
    at the input device, receiving a third user input setting the secondary data visualization as a new primary data visualization;
    at the processor, applying the one or more predefined relevance criteria to the database to identify a plurality of tertiary data sets of the database that meet the one or more predefined relevance criteria, the one or more predefined relevance criteria specifying relevance of data values of a tertiary data set to the secondary data set; and
    automatically displaying, in association with the new primary data visualization, a tertiary graphical representation of each of the plurality of tertiary data sets for selection by the user to further analyze a different aspect of the secondary data set.

2. The computer-implemented method of claim 1, further comprising:
    identifying a plurality of secondary data sets from the database; and wherein
    automatically displaying, in association with the primary data visualization, the
    secondary graphical representation for the secondary data set comprises:
    automatically displaying a plurality of indicators in the graphical user interface that are respectively representative of the plurality of secondary data sets, each indicator from the plurality of indicators being individually selectable by the user to view a corresponding secondary data visualization graphically illustrating a corresponding secondary data set from the plurality of secondary data sets.

3. The computer-implemented method of claim 2, wherein each indicator comprises a thumbnail image of the corresponding secondary data visualization.

4. The computer-implemented method of claim 1, further comprising:
    identifying a plurality of secondary data sets from the database; and wherein
    automatically displaying, in association with the primary data visualization, the secondary graphical representation for the secondary data set comprises:
    automatically displaying a plurality of secondary data visualizations that are respectively representative of the plurality of secondary data sets, each secondary data visualization of the plurality of secondary data visualizations graphically illustrating a corresponding secondary data set from the plurality of secondary data sets.

5. The computer-implemented method of claim 1, further comprising:
    adding a graphical representation of the primary data visualization and the secondary graphical representation of the secondary data set to a playback section of the graphical user interface, the playback section reflecting an analysis path of the primary data set by the user.

6. The computer-implemented method of claim 1, further comprising:
    generating, at the processor, monitoring data from monitoring the second user input selecting the secondary graphical representation; and
    incorporating the monitoring data into the one or more predefined relevance criteria.

7. The computer-implemented method of claim 1, wherein the primary data set comprises a plurality of data values and the one or more predefined relevance criteria include one or more of:
 a determination that the secondary data set includes at least some of the plurality of data values of the primary data set;
 a determination that the secondary data set does not include more than a maximum number of data values;
 a determination that the secondary data set does not include fewer than a minimum number of data values;
 a determination that the secondary data set includes data values that are dimensions;
 a determination that the secondary data set includes data values that are of a data type different from that of the plurality of data values of the primary data set;
 a determination that the secondary data set includes data values with descriptors different from that of the plurality of data values of the primary data set;
 a determination that the secondary data set includes data values contained within a previous data set graphically illustrated by a previous data visualization previously selected for viewing by the user; and
 a determination that the secondary data set includes data values with data parameters that are the same as those of data values of a previous data set graphically illustrated by a previous data visualization previously selected for viewing by the user.

8. A computer system, comprising:
one or more processors; and
one or more memories storing computer logic that, when executed by the one or more processors, causes the computer system to perform operations including:
 at an input device, receiving, from a user, a first user input selecting a primary data visualization;
 at a display device, responsive to receipt of the first user input, displaying a graphical user interface including the primary data visualization, the primary data visualization graphically illustrating a primary data set from a database;
 at the one or more processors, responsive to receipt of the first user input,
  automatically identifying a data field in the database that meets one or more predefined relevance criteria for a secondary data set, the one or more predefined relevance criteria specifying relevance of data values of the secondary data set to the primary data set; and
  retrieving data values of the data field from the database to obtain the secondary data set;
 automatically displaying, in the graphical user interface in association with the primary data visualization, a secondary graphical representation for the secondary data set for selection by the user to further analyze a different aspect of the primary data set of the primary data visualization;
 responsive to automatically displaying the secondary graphical representation for the secondary data set, receiving, at the input device, a second user input selecting the secondary graphical representation for further analysis of the different aspect of the primary data set represented by the secondary graphical representation;
 at the display device, responsive to receipt of the second user input, displaying a secondary data visualization graphically illustrating the secondary data set;
 at the input device, receiving a third user input setting the secondary data visualization as a new primary data visualization;
 at the one or more processors, applying the one or more predefined relevance criteria to the database to identify a plurality of tertiary data sets of the database that meet the one or more predefined relevance criteria, the one or more predefined relevance criteria specifying relevance of data values of a tertiary data set to the secondary data set; and
 automatically displaying, in association with the new primary data visualization, a tertiary graphical representation of each of the plurality of tertiary data sets for selection by the user to further analyze a different aspect of the secondary data set.

9. The computer system of claim 8, wherein the computer logic causes the computer system to perform the operations including:
 identifying a plurality of secondary data sets from the database; and wherein
 automatically displaying, in association with the primary data visualization, the secondary graphical representation for the secondary data set comprises:
  automatically displaying a plurality of indicators in the graphical user interface that are respectively representative of the plurality of secondary data sets, each indicator from the plurality of indicators being individually selectable by the user to view a corresponding secondary data visualization graphically illustrating a corresponding secondary data set from the plurality of secondary data sets.

10. The computer system of claim 9, wherein each indicator comprises a thumbnail image of the corresponding secondary data visualization.

11. The computer system of claim 8, wherein the computer logic causes the computer system to perform the operations including:
 identifying a plurality of secondary data sets from the database; and wherein
 automatically displaying, in association with the primary data visualization, the secondary graphical representation for the secondary data set comprises:
  automatically displaying a plurality of secondary data visualizations that are respectively representative of the plurality of secondary data sets, each secondary data visualization of the plurality of secondary data visualizations graphically illustrating a corresponding secondary data set from the plurality of secondary data sets.

12. The computer system of claim 8, wherein the computer logic causes the computer system to perform the operations including:
 adding a graphical representation of the primary data visualization and the secondary graphical representation of the secondary data set to a playback section of the graphical user interface, the playback section reflecting an analysis path of the primary data set by the user.

13. The computer system of claim 8, wherein the computer logic causes the computer system to perform the operations including:
 generating, by the one or more processors, monitoring data from monitoring the second user input selecting the secondary graphical representation; and
 incorporating the monitoring data into the one or more predefined relevance criteria.

14. The computer system of claim 8, wherein the primary data set comprises a plurality of data values and the one or more predefined relevance criteria include one or more of:
- a determination that the secondary data set includes at least some of the plurality of data values of the primary data set;
- a determination that the secondary data set does not include more than a maximum number of data values;
- a determination that the secondary data set does not include fewer than a minimum number of data values;
- a determination that the secondary data set includes data values that are dimensions;
- a determination that the secondary data set includes data values that are of a data type different from that of the plurality of data values of the primary data set;
- a determination that the secondary data set includes data values with descriptors different from that of the plurality of data values of the primary data set;
- a determination that the secondary data set includes data values contained within a previous data set graphically illustrated by a previous data visualization previously selected for viewing by the user; and
- a determination that the secondary data set includes data values with data parameters that are the same as those of data values of a previous data set graphically illustrated by a previous data visualization previously selected for viewing by the user.

15. A system comprising:
- means for receiving, from a user, a first user input selecting a primary data visualization;
- means for displaying a graphical user interface including the primary data visualization, the primary data visualization graphically illustrating a primary data set from a database;
- means for automatically identifying a data field in the database that meets one or more predefined relevance criteria for a secondary data set, the one or more predefined relevance criteria specifying relevance of data values of the secondary data set to the primary data set;
- means for retrieving data values of the data field from the database to obtain the secondary data set;
- means for automatically displaying, in the graphical user interface in association with the primary data visualization, a secondary graphical representation for the secondary data set for selection by the user to further analyze a different aspect of the primary data set of the primary data visualization;
- means for, responsive to automatically displaying the secondary graphical representation for the secondary data set, receiving a second user input selecting the secondary graphical representation for further analysis of the different aspect of the primary data set represented by the secondary graphical representation;
- means for, responsive to receipt of the second user input, displaying a secondary data visualization graphically illustrating the secondary data set;
- means for receiving a third user input setting the secondary data visualization as a new primary data visualization;
- means for applying the one or more predefined relevance criteria to the database to identify a plurality of tertiary data sets of the database that meet the one or more predefined relevance criteria, the one or more predefined relevance criteria specifying relevance of data values of a tertiary data set to the secondary data set; and
- means for automatically displaying, in association with the new primary data visualization, a tertiary graphical representation of each of the plurality of tertiary data sets for selection by the user to further analyze a different aspect of the secondary data set.

16. The system of claim 15, further comprising:
- means for identifying a plurality of secondary data sets from the database, wherein the means for automatically displaying, in the graphical user interface in association with the primary data visualization, the secondary graphical representation for the secondary data set comprises:
  - automatically displaying a plurality of indicators in the graphical user interface that are respectively representative of the plurality of secondary data sets, each indicator from the plurality of indicators being individually selectable by the user to view a corresponding secondary data visualization graphically illustrating a corresponding secondary data set from the plurality of secondary data sets.

17. The system of claim 16, wherein each indicator comprises a thumbnail image of the corresponding secondary data visualization.

18. The system of claim 15, further comprising:
- means for identifying a plurality of secondary data sets from the database, wherein the means for automatically displaying, in the graphical user interface in association with the primary data visualization, the secondary graphical representation for the secondary data set comprises:
  - means for automatically displaying a plurality of secondary data visualizations that are respectively representative of the plurality of secondary data sets, each secondary data visualization of the plurality of secondary data visualizations graphically illustrating a corresponding secondary data set from the plurality of secondary data sets.

19. The system of claim 15, further comprising:
- means for adding a graphical representation of the primary data visualization and the secondary graphical representation of the secondary data set to a playback section of the graphical user interface, the playback section reflecting an analysis path of the primary data set by the user.

* * * * *